United States Patent
Ihm et al.

(10) Patent No.: US 8,325,843 B2
(45) Date of Patent: Dec. 4, 2012

(54) MIMO CODEBOOK GENERATION

(75) Inventors: Bin-Chul Ihm, Gyeonggi-Do (KR);
Sung-Ho Park, Gyeonggi-Do (KR);
Seung-Hyun Kang, Gyeonggi-Do (KR);
Wook-Bong Lee, Gyeonggi-Do (KR);
Moon-Il Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 223 days.

(21) Appl. No.: 12/756,085

(22) Filed: Apr. 7, 2010

(65) Prior Publication Data
US 2010/0260243 A1    Oct. 14, 2010

Related U.S. Application Data

(60) Provisional application No. 61/167,858, filed on Apr. 8, 2009, provisional application No. 61/172,766, filed on Apr. 26, 2009, provisional application No. 61/173,211, filed on Apr. 28, 2009, provisional application No. 61/177,283, filed on May 12, 2009, provisional application No. 61/219,336, filed on Jun. 22, 2009, provisional application No. 61/219,735, filed on Jun. 23, 2009, provisional application No. 61/222,455, filed on Jul. 1, 2009, provisional application No. 61/222,906, filed on Jul. 2, 2009, provisional application No. 61/223,382, filed on Jul. 7, 2009, provisional application No. 61/224,040, filed on Jul. 8, 2009.

(30) Foreign Application Priority Data

Mar. 18, 2010    (KR) ........................ 10-2010-0024421

(51) Int. Cl.
*H04B 7/02*    (2006.01)

(52) U.S. Cl. ......... 375/267; 375/260; 375/296; 375/299
(58) Field of Classification Search .................. 375/260, 375/267, 299; 370/334, 436; 341/55
See application file for complete search history.

(56) References Cited

U.S. PATENT DOCUMENTS

| | | | |
|---|---|---|---|
| 8,000,301 B2* | 8/2011 | Mihota | 370/334 |
| 8,050,357 B2* | 11/2011 | Clerckx et al. | 375/299 |
| 2007/0248113 A1* | 10/2007 | Ko et al. | 370/436 |
| 2008/0186212 A1* | 8/2008 | Clerckx et al. | 341/55 |
| 2009/0323841 A1* | 12/2009 | Clerckx et al. | 375/260 |
| 2010/0034308 A1* | 2/2010 | Kim et al. | 375/267 |
| 2010/0118989 A1* | 5/2010 | Sayana et al. | 375/260 |
| 2010/0150266 A1* | 6/2010 | Mondal et al. | 375/296 |
| 2010/0215112 A1* | 8/2010 | Tsai et al. | 375/267 |
| 2010/0260234 A1* | 10/2010 | Thomas et al. | 375/141 |

FOREIGN PATENT DOCUMENTS

| | | |
|---|---|---|
| KR | 1020080084502 | 9/2008 |
| KR | 1020080095732 | 10/2008 |
| WO | 2006075220 | 7/2006 |

* cited by examiner

*Primary Examiner* — David Ometz
*Assistant Examiner* — Fitwi Hailegiorgis
(74) *Attorney, Agent, or Firm* — Lee, Hong, Degerman, Kang & Waimey

(57) ABSTRACT

Particular codebook entries used for a MIMO system of a lower dimension (i.e., having a relatively low number of antennas) can be used to generate a codebook for a MIMO system of a higher dimension (i.e., having a relatively high number of antennas). The entries in rank 1 of the codebook related to the MIMO system having four transmit antennas are used to newly construct entries for rank 1 through rank 8 of two base matrices for a MIMO base codebook related to eight transmit antennas.

9 Claims, 16 Drawing Sheets

Block diagram for MIMO for 802.16 (OFDM)

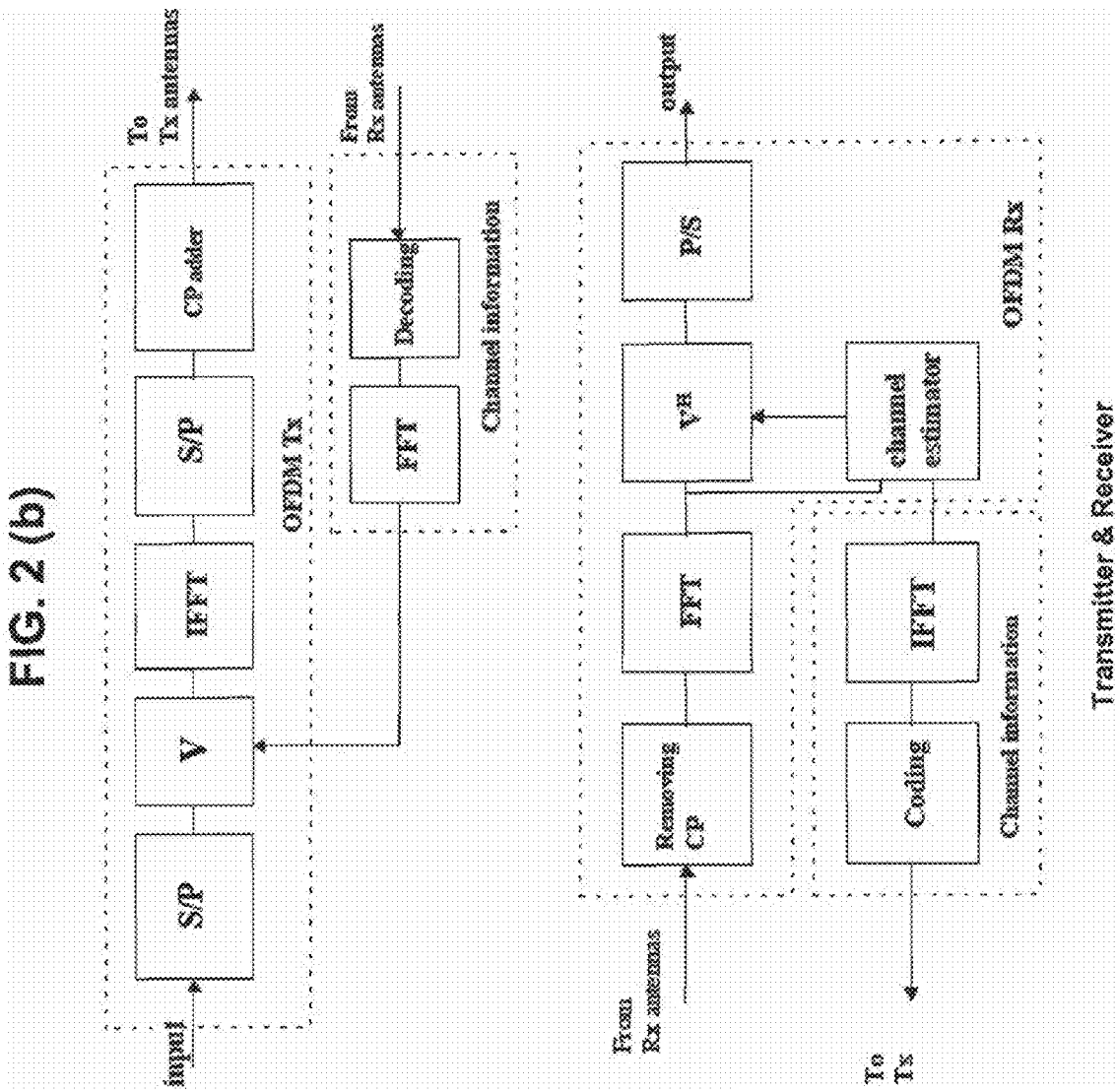

MIMO precoding

Beamforming

ULA

XPol Type 1

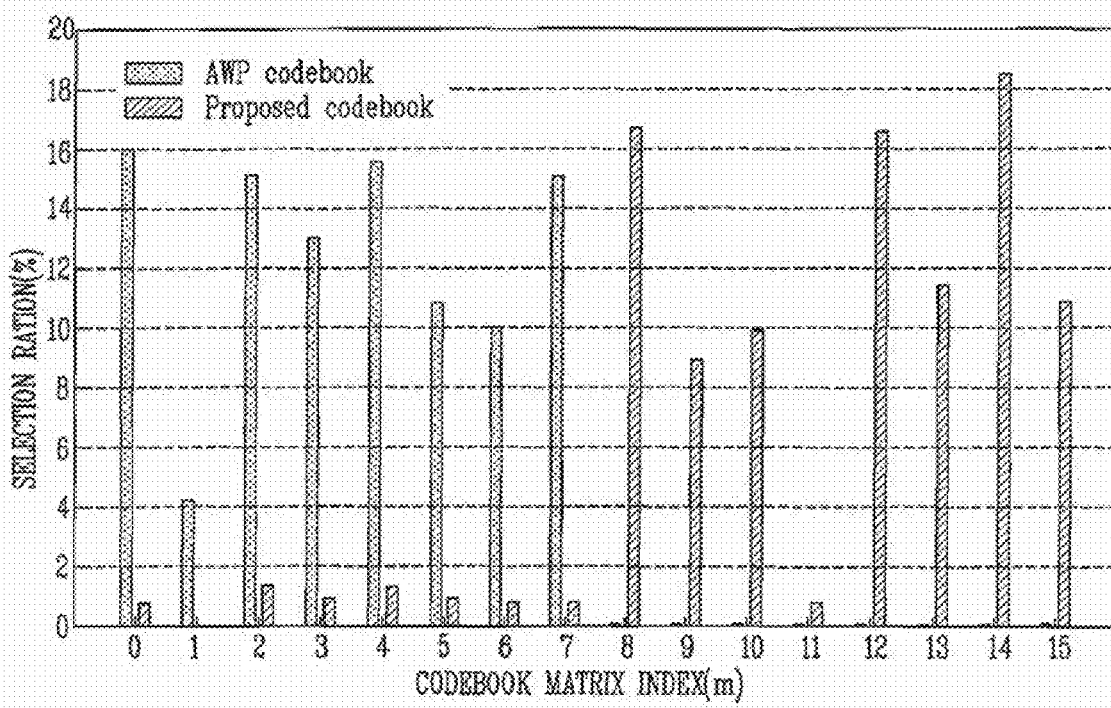

FIG. 12

| Binary index | m | Base Matrix | C(8,2,4,m) | Base Matrix | C(8,3,4,m) | C(8,4,4,m) | C(8,5,4,m) | C(8,6,4,m) | C(8,7,4,m) | C(8,8,4,m) |
|---|---|---|---|---|---|---|---|---|---|---|
| 0000 | 0 | $P_8^{(x,1)}$ | 15 | $P_8^{(x,3)}$ | 135 | 1537 | 12357 | 123567 | 1234567 | 12345678 |
| 0001 | 1 | | 26 | | 246 | 2648 | 1246 8 | 124568 | 1234568 | n/a |
| 0010 | 2 | | 37 | | 237 | 3726 | 23467 | 124678 | 1234678 | n/a |
| 0011 | 3 | | 48 | | 148 | 4815 | 13458 | 134578 | 12345 78 | n/a |
| 0100 | 4 | | 53 | | 357 | 5572 | 23567 | 134568 | 234578 | n/a |
| 0101 | 5 | $P_8^{(x,2)}$ | 46 | | 468 | 6481 | 14568 | 124678 | 134568 | n/a |
| 0110 | 6 | | 27 | | 267 | 7284 | 24678 | 123468 | 124568 | n/a |
| 0111 | 7 | | 81 | | 158 | 8153 | 13578 | 123578 | 123578 | n/a |
| 1000 | 8 | $P_8^{(x,3)}$ | 12 | $P_8^{(x,4)}$ | 123 | 1234 | 12345 | 123456 | 1234567 | 12345678 |
| 1001 | 9 | | 34 | | 124 | 1246 | 12456 | 123467 | 124567 | n/a |
| 1010 | 10 | | 56 | | 234 | 2457 | 23478 | 123478 | 123478 | n/a |
| 1011 | 11 | | 78 | | 134 | 1348 | 13478 | 134678 | 1234678 | n/a |
| 1100 | 12 | | 12 | | 578 | 3578 | 23578 | 235678 | 123578 | n/a |
| 1101 | 13 | | 34 | | 678 | 4678 | 14678 | 145678 | 134678 | n/a |
| 1110 | 14 | | 56 | | 576 | 5678 | 35678 | 345678 | 234568 | n/a |
| 1111 | 15 | | 78 | | 568 | 1568 | 13568 | 123568 | 1234568 | n/a |

New codebook generation

MIMO device

MIMO CODEBOOK GENERATION

CROSS-REFERENCE TO RELATED APPLICATIONS

Pursuant to 35 U.S.C. §119, this application claims the benefit of earlier filing date and right of priority to Korean Application No. 10-2010-0024421, filed on Mar. 18, 2010, and also claims the benefit of earlier filing date and right of priority to U.S. Provisional Application Nos. 61/167,858, filed on Apr. 8, 2009, 61/172,766, filed on Apr. 26, 2009, 61/173,211, filed on Apr. 28, 2009, 61/177,283, filed on May 12, 2009, 61/219,336, filed on Jun. 22, 2009, 61/219,735, filed on Jun. 23, 2009, 61/222,455, filed on Jul. 1, 2009, 61/222,906, filed on Jul. 2, 2009, 61/223,382, filed on Jul. 7, 2009, and 61/224,040, filed on Jul. 8, 2009, the contents of which are all hereby incorporated by reference herein in their entireties.

BACKGROUND

In the related art, certain procedures related to Multiple Input Multiple Output (MIMO) processing techniques were problematic due to complicated calculations and overall processing burden. As such, the related art technologies do not sufficiently address such issues, and thus do not offer appropriate solutions.

SUMMARY

The present inventors recognized at least the above-identified drawbacks of the related art. Based upon such recognition, the various features described hereafter have been conceived such that certain procedures related to Multiple Input Multiple Output (MIMO) processing techniques are more efficiently and effectively performed. In particular, specific codebook based precoding techniques can be adapted for more complicated situations that require the use of a greater number of transmit antennas in the MIMO system. As a result, complicated calculations and overall processing burden are minimized.

BRIEF DESCRIPTION OF THE DRAWINGS

FIG. 12 shows an exemplary table containing codebook entries for the two newly generated matrices implemented for a SU-MIMO base codebook according to the present disclosure.

DETAILED DESCRIPTION

The inventive concepts and features herein are generally explained in terms of OFDM-MIMO technology. However, such details are not meant to limit the various features described herein, which are applicable to other types of mobile and/or wireless (radio) communication systems and methods.

With respect to transmissions on the downlink and on the uplink, various types of multiplexing and multiple access techniques need to be considered. On the downlink, certain types of multiplexing techniques can be used, such as time division multiplexing, frequency division multiplexing, and code division multiplexing. On the uplink, certain types of multiple access techniques can be used, such as time division multiple access, frequency division multiple access, and code division multiple access.

Figure 1:
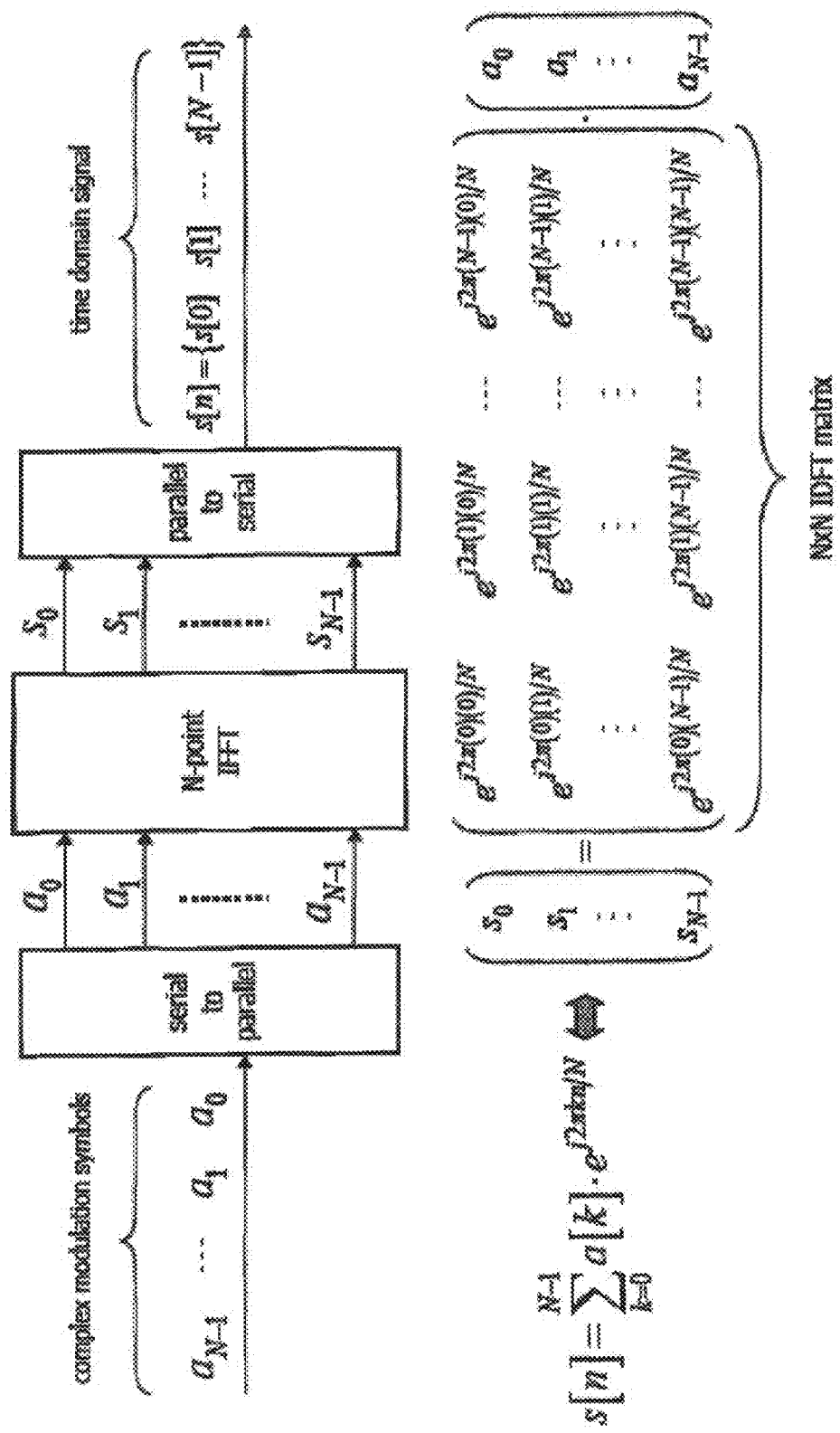
FIG. 1 shows some exemplary concepts related to Orthogonal Frequency Division Multiplexing (OFDM) technology.

Referring to FIG. 1, Orthogonal Frequency Division Multiplexing (OFDM) is one type of frequency division multiplexing technique. In particular, OFDM is a bandwidth-efficient technique for multi-carrier modulation. Namely, OFDM is a frequency division multiplexing (FDM) scheme utilized as a digital multi-carrier modulation method. A large number of closely spaced orthogonal sub-carriers are used to carry data, which is divided into several parallel data streams or channels, one for each sub-carrier. Each sub-carrier is modulated with a particular modulation scheme, such as quadrature amplitude modulation (QAM) or phase shift keying (PSK) at a low symbol rate, which can maintain total data rates to be similar to single-carrier modulation schemes in the same bandwidth.

Some basic characteristics and operation principles of OFDM include the concepts of orthogonality, use of Fast Fourier Transform (FFT) algorithms (and/or Inverse FFT (IFFT) algorithms), insertion of guard intervals to minimize inter-symbol interference (IR), equalization for frequency response characteristics, performing channel coding (or forward error correction: FEC), frequency and/or time interleaving, use of adaptive transmissions, spatial diversity, linear transmitter power amplification, and the like. For the sake of brevity, these characteristics and principles will not be explained in detail, but those skilled in the art can understand that such characteristics and principles are all applicable to and part of the present disclosure.

Some technical standards that are related to OFDM include OFDMA, IEEE 802.11a/g/n, 802.16, 802.20, 3GPP LTE, 3GPP LTE-Advanced (LTE-A), Evolved UMTS Terrestrial Radio Access (E-UTRA), and the like, which are all applicable to the present disclosure.

Figure 2:
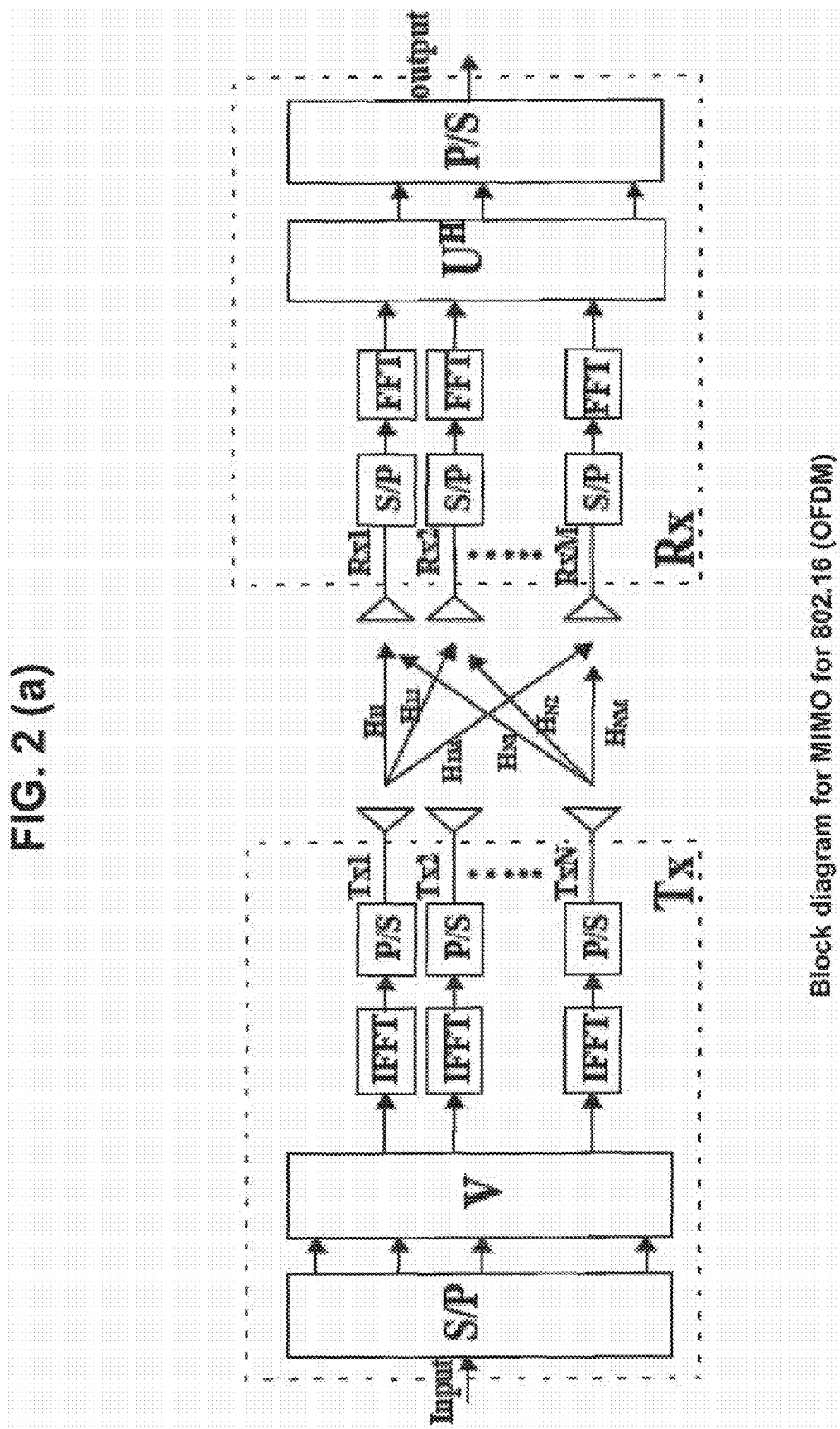
FIG. 2 shows some exemplary concepts related to Multiple Input Multiple Output (MIMO) technology.

Referring to FIG. 2, multiple access techniques can also be referred to as Multiple Input Multiple Output (MIMO) technology. Basically, MIMO relates to using multiple antennas at both a transmitter and a receiver to improve radio communication performance. MIMO can be considered as one type of so-called smart antenna technology.

MIMO technology is attractive for wireless communications, because it offers significant increases in data throughput and link range without additional bandwidth or transmit power. Such can be achieved because of higher spectral efficiency, which allows m for transmission and reception of more bits per second per hertz of bandwidth, and because of link reliability or diversity due to reduced fading.

MIMO can be categorized as single-user (SU) MIMO, multi-user (MU) MIMO, cooperative MIMO, networked MIMO, and the like. Single-user (SU) MIMO relates to using multiple antennas at both the transmitter and the receiver (point-to-point). Multi-user (MU) MIMO relates to communicating simultaneously with multiple independent radio terminals using the same frequency (point-to-multipoint or multipoint-to-point). Cooperative MIMO relates to using the transmitter or receiver cooperation of distributed antennas belonging to many different nodes to achieve MIMO advantages. Networked MIMO relates to using the cooperation among network nodes to achieve MIMO advantages. Each of these MIMO categories has particular features and exhibit certain characteristics under IEEE 802.11, 802.16, 3GPP LTE (LTE-A), and the like, which are all applicable to the present disclosure.

MIMO can also be sub-divided into three main categories: spatial multiplexing (SM), diversity coding, and precoding.

Spatial multiplexing involves a high rate signal being split into multiple lower rate streams, and each stream is transmitted from a different transmit antenna in the same frequency channel. If these signals arrive at the receiver antenna array with sufficiently different spatial signatures, the receiver can separate these streams to create parallel channels or streams. Spatial multiplexing can increase channel capacity at higher signal-to-noise ratio (SNR). The maximum number of spatial streams is limited by the lesser in the number of antennas at the transmitter or receiver. Spatial multiplexing can be used with or without knowledge of transmit channel information.

Diversity coding is a technique that is used when there is no knowledge of transmit channel information at the transmitter. In diversity methods, a single stream (unlike multiple streams in spatial multiplexing) is transmitted, but the signal is coded using space-time coding techniques. The signal is emitted from each of the transmit antennas using certain principles of full or near orthogonal coding. Diversity exploits the independent fading in the multiple antenna links to enhance signal diversity. Because there is no channel knowledge, there is no beamforming or array gain from diversity coding.

Precoding relates to the concept of beamforming, in which the same signal is emitted from each transmit antenna with appropriate phase (and sometimes gain) weighting such that the signal power is maximized at the receiver input. Beamforming increases the signal gain from constructive combining and reduces multipath fading effects. When the receiver has multiple antennas, such beamforming cannot simultaneously maximize the signal level at all of the receive antennas, and thus precoding is also used. Typically, precoding requires knowledge of the channel state information (CSI) at the transmitter.

Figure 3:
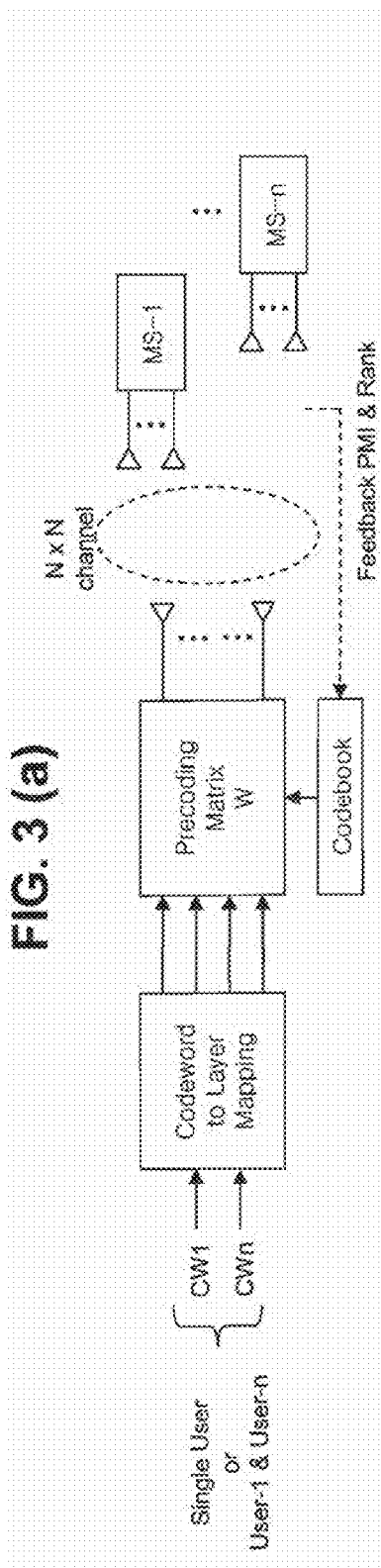
FIG. 3 shows an exemplary concepts related to MIMO precoding techniques.
Figure 3:
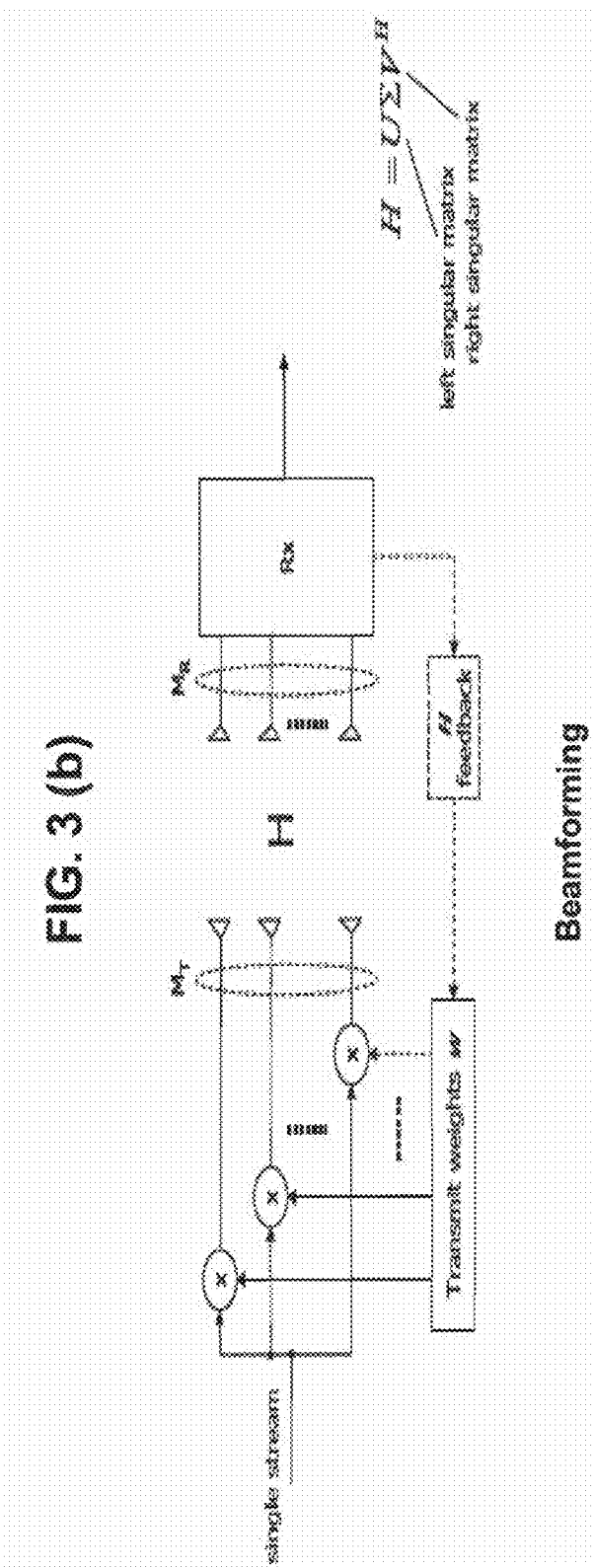

Referring to FIG. 3, in MIMO precoding techniques, the transmitted data is divided into multiple independent transmit streams, whereby each streams is individually precoded and all precoded streams are superimposed before transmission. The number of transmit streams is referred to as a transmission rank. Here, a transmission rank can be defined as the spatial multiplexing order. The transmission rank can be optimally chosen for a given channel, upon consideration of transmit power and various channel characteristics. For each transmit stream, the precoder is a beamforming vector that consists of a set of weights (one for each antenna) that are multiplied with the transmitted symbol prior to transmission.

The precoder of rank r is then a matrix consists of r beamforming vectors as its columns. The average transmit power may be divided equally among all transmit streams, in which case, the norm of all beamforming vectors are equal and normalized to one. Also, because of the superposition of the transmit streams, the beamforming vectors are chosen to be orthogonal for simplicity of the decoding. As a result, the precoder is generally a semi-unitary matrix.

In so-called codebook based precoding, a predefined codebook is provided for the transmitter (base station: BS) and for all receivers (mobile stations: MS). Each receiver can then choose a precoder from the codebook that maximizes its performance and will feed back an index (or other value/indicator) related to the selected precoder. The selection of precoder rank should also be included in the precoder selection algorithm.

Also, MIMO employs closed-loop (CL) operation or open-loop (OL) operation.

For closed-loop (CL) operation, feedback from the receiver side is required. Here, a sounding packet for channel state information (CSI) construction at the transmitter side may be used. Also, explicit feedback, such as using a quantized CSI may be used. Additionally, a pointer to a quantized codebook of precoding matrices can be used. Also, the concepts of beamforming and precoded spatial division multiplexing (SDM) may be employed.

For open-loop (OL) operation, no feedback is required from the receiver side. Also, the features of transmit diversity, switched beams, spatial division multiplexing (SDM), and hybrid schemes (such as SDM combined with transmit diversity) may be employed. Here, for SDM, the precoding matrix is an identity matrix or a matrix that is randomly chosen from the codebook.

The present inventors recognized that various operations related to codebook based precoding techniques could be improved. It is important to note that such problem recognition was based upon concentrated investigation, rigorous simulations, and experimental testing conducted by the present inventors. As a result, the present inventors have found that particular codebook entries used for a MIMO system of a lower dimension (i.e., having a relatively low number of antennas) can be used to generate a codebook for a MIMO system of a higher dimension (i.e., having a relatively high number of antennas). In particular, the concept of using the entries in rank 1 of the codebook related to the MIMO system having four transmit antennas to newly construct entries for rank 1 through rank 8 of two base matrices for a MIMO base codebook related to eight transmit antennas has never been provided or suggested in any known method of codebook based precoding prior to the work done by the present inventors as described in this disclosure and in the priority document disclosures.

Various exemplary embodiments will be explained in more detail below.

I. Codebook Generation Using Both a DFT Base Matrix and a Block Diagonal Matrix a) Base Codebook Matrix Using N-Point DFT Matrix In the MIMO scheme, N-point DFT matrix $W_N$ (or its modification using column permutation, phase shift, or both) can be used for generating an N-transmit antenna codebook as a base matrix.

N-point DFT matrix:

$$W_N = \frac{1}{\sqrt{N}} \begin{bmatrix} 1 & 1 & \ldots & 1 \\ 1 & \omega^1 & \ldots & \omega^{N-1} \\ \vdots & \vdots & & \vdots \\ 1 & \omega^{N-1} & \ldots & \omega^{(N-1)(N-1)} \end{bmatrix},$$

where $\omega = e^{-2\pi j/N}$ b) Base Codebook Matrix Using Block Diagonal Matrix A block diagonal matrix $W_B$ which consists of two N/2 point DFT matrices (or its modification using column permutation, phase shift or both of them) and two N/2-by-N/2 zero matrices can also be used for generating an N transmit antenna codebook as a base matrix.

Block diagonal matrix:

$$W_B = \begin{bmatrix} W_{N/2} & 0 \\ 0 & W'_{N/2} \end{bmatrix},$$

where both $W_{N/2}$ and $W_{1/2}'$ denotes N/2-point DFT matrix or its modification.

c) Codebook Generation for Rank R

A codebook in different ranks are comprised of a subset of the base codebook vectors. A codebook for rank R is constructed by using R column vectors of the base matrix W. If w(i) denotes the i-th column vector of the base matrix W, then a codebook C for rank R is as follows:

$$C=[w(i_0), w(i_1), \ldots, w(i_{R-1})],$$

where $i_r$ is an integer number and $1 \leq i_r \leq N$ d) N-Bit Codebook Generation with N-Point DFT Base Matrix An n-bit codebook is constructed from the base matrix by using 2n combinations of codebook column vectors.

Example: 2-bit codebook Ci (, where i=0, 1, 2, 3) generation for rank 2 by using 4-point DFT base matrix, whereby index i represents a codebook index:

4-point DFT matrix:

$$W_4 = \frac{1}{2}\begin{bmatrix} 1 & 1 & 1 & 1 \\ 1 & -i & -1 & i \\ 1 & -1 & 1 & -1 \\ 1 & i & -1 & -i \end{bmatrix}$$

$$C_0 = [w(0), w(1)] = \frac{1}{2}\begin{bmatrix} 1 & 1 \\ 1 & -i \\ 1 & -1 \\ 1 & i \end{bmatrix},$$

$$C_1 = [w(1), w(2)] = \frac{1}{2}\begin{bmatrix} 1 & 1 \\ -i & -1 \\ -1 & 1 \\ i & -1 \end{bmatrix},$$

$$C_2 = [w(2), w(3)] = \frac{1}{2}\begin{bmatrix} 1 & 1 \\ -1 & i \\ 1 & -1 \\ -1 & -i \end{bmatrix},$$

$$C_3 = [w(3), w(0)] = \frac{1}{2}\begin{bmatrix} 1 & 1 \\ i & 1 \\ -1 & 1 \\ -i & 1 \end{bmatrix}$$

e) Codebook Generation Using Multiple Base Matrices

When it is assumed that there are multiple base matrices, it is possible to construct a rank R codebook by using either a column vector from a single base matrix or a column vector from multiple base matrices:

Two base matrices:

$$W_1=[w_1(0), \ldots, w_1(N-1)] \text{ and } W_2=[w_2(0), \ldots, w_2(N-1)]$$

Codebook from single base matrix:

$$C=[c(0), \ldots, c(R-1)]=[w_1(i_0), \ldots, w_1(i_{R-1})] \text{ or } [w_2(i_0), \ldots, w_2(i_{R-1})],$$

where i is a positive integer number between 0 and N−1

Codebook from two base matrices:

$$C=[c(0), \ldots, c(R-1)]=[w_1(i_0), w_2(i_1), \ldots, w_1(i_{R-2}), w_2(i_{R-1})],$$

where i is a positive integer number between 0 and N−1 f) Codebook Generation Using Both a DFT Base Matrix and a Block Diagonal Matrix

The power of a column element in $W_N$ is always 1/N. The power of a column element in $W_B$ is 2/N for a half and 0 for the other half because of N/2-by-N/2 zero matrices in the matrix. Since there exists power difference of a column element between $W_N$ and $W_B$, it is required to have constraint of constructing a codebook as follows.

Let n denotes number of column vectors from $W_N$ and m denotes number of column vectors from $W_B$ to construct a rank R codebook, where R=n+m. Here, m shall be an even number and m/2 column vectors of the codebook shall be taken from among the first half columns of $W_B$ and other m/2 column vectors shall be taken from among the other half columns of $W_B$.

When R is an odd number, n≠0 and the n column vectors of the codebook shall be taken from $W_N$. If R is an even number and n=0, the codebook can be constructed by using $W_B$ only. If m=0, the codebook can be constructed by using $W_N$ only regardless the value of R, whereby R=n+m (m should be an even number, such that all Tx antennas have the same power.)

It should be noted that for the above description of the proposed codebook generation method, DFT (as well as FFT) matrix has been used. However, it is trivial to use IDFT (as well as IFFT) matrix instead of DFT matrix in the proposed method. Also, a modification of IDFT (using column permutation, phase shift or both of them) can be used. For $W_N$, any unitary matrix can be placed, which has no zero element. For $W_B$, any block diagonal or its permuted version can be considered.

The following exemplary procedures (1) through (5) show how a higher dimensional codebook can be configured, generated, or adapted by using a lower dimensional codebook, as conceived and developed by the present inventors:

(1) 4G MIMO Configuration of 8Tx Codebook Using 4Tx Codebook

In 3GPP Rel-8 (i.e., the LTE system), up to 4Tx MIMO transmission is supported over the downlink, while the LTE-A system can support up to 8Tx MIMO transmission to enhance the system throughput compared to that of the LTE system. For the purpose of obtaining remarkable benefits in terms of system throughput, the LTE-A system supporting a 8Tx antenna system should provide a CL-MIMO scheme based on either the use of a codebook or CSI direct feedback. Here, IEEE 802.16 also considers a 8Tx CL-MIMO system for the identical purpose as that of the LTE-A system.

To design a codebook for CL-MIMO, there are several consideration points and requirements according to the particular system being used, such as 3GPP LTE-A or IEEE 802.16. It is not difficult to design a codebook up to 4Tx CL-MIMO, while satisfying the requirements and considerations. However, the design of a codebook for 8Tx CL-MIMO is more challenging. Even if a new codebook for 8Tx CL-MIMO is provided, the UE or MS should use three different codebooks for 2Tx, 4Tx and 8Tx CL-MIMO operations, respectively, and this is not so desirable because additional space in memory is required to store all of these different codebooks. As such, the present inventors addressed this drawback by introducing a simple method to configure the codebook for 8Tx CL-MIMO operation using the codebook for 4Tx CL-MIMO, regardless of the type of system (i.e. 3GPP LTE-A, IEEE 802.16, etc.), and which does not require any additional memory for storing the 8Tx codebook.

In the LTE-A system, the codebook for 8Tx CL-MIMO is recommended to have the following properties: (1) Unitary; (2) Constant modulus; (3) Nested structure; (4) Constrained alphabet, e.g., 8PSK.

However, the codebook configuration method used for 4Tx CL-MIMO in LTE does not provide a 8Tx codebook that satisfies all of the above four properties. Thus, there are several proposals for creating a 8Tx codebook that exhibit the above four properties.

In the conventional IEEE 802.16m, the proposed codebooks for 4Tx and 8Tx CL-MIMO have no relationship with each other, and the MS needs to store these irrelevant codebooks at its memory to support various kinds of CL-MIMO operation.

In order to provide easier configuration of the 8Tx codebook and to save memory space in the UE (or MS) and/or in the eNode-B (or BS), it is very desirable to re-use the existing 4Tx codebook when configuring a new 8Tx codebook.

Given a particular 4Tx codebook, a 8Tx codebook can be easily configured by re-use of the 4Tx codebook. For example, in order to build a 8Tx codebook for rank 1, the following method (employing Equation 1) can be used:

$$w_1^8(k) = \begin{bmatrix} \alpha_1 w_1^4(n) \\ \beta_1 w_1^4(m) \end{bmatrix}, k = 0, 1, \ldots, L_1 - 1 \quad \text{[Equation 1-1]}$$

where $w_R^{N_{Tx}}(k)$ means the k th entry of the $N_{Tx}$ Tx codebook for rank R, and $L_R$ denotes the number of entries of the 8Tx codebook for rank R which can be obtained by the inventive concepts described herein. Also, $\alpha_R$ and $\beta_R$ are scaling factors. For LTE and LTE-A systems, the $\alpha_R$ and $\beta_R$ can be set to make $$\left(w_R^{N_{Tx}}(k)\right)^H w_R^{N_{Tx}}(k) = \frac{1}{R} I_{R \times R}.$$

For IEEE 802.16m, the values of $\alpha_R$ and $\beta_R$ can be set to make $(w_R^{N_{Tx}})^H w_R^{N_{Tx}}(k) = I_{R \times R}$. For LTE and LTE-A systems, as well as for IEEE 802.16m, $\alpha_1 = \beta_1 = 1/\sqrt{2}$ is one example of the values that may be used.

The simplest way for the configuration of a codebook for rank 1 is to set as m=n=k. One of several alternative ways is to use n=k and m=mod(k+k$_1$, L$_1$). From this configuration, we can get L$_1$ entries of 8Tx codebook for rank 1.

To obtain more entries of the 8Tx codebook for rank 1, the following extensions can be used:

$$w_1^8(L_1 + k) = \begin{bmatrix} \alpha_1 w_1^4(n) - \\ \beta_1 w_1^4(m) \end{bmatrix}, \quad \text{[Equation 1-2]}$$

$$w_1^8(2L_1 + k) = \begin{bmatrix} \alpha_1 w_1^4(n) \\ j\beta_1 w_1^4(m) \end{bmatrix},$$

$$w_1^8(3L_1 + k) = \begin{bmatrix} \alpha_1 w_1^4(n) - \\ j\beta_1 w_1^4(m) \end{bmatrix},$$

$$w_1^8(4L_1 + k) = \begin{bmatrix} \alpha_1 w_1^4(n) \\ \left(\frac{1+j}{\sqrt{2}}\right)\beta_1 w_1^4(m) \end{bmatrix},$$

$$w_1^8(5L_1 + k) = \begin{bmatrix} \alpha_1 w_1^4(n) \\ \left(\frac{1-j}{\sqrt{2}}\right)\beta_1 w_1^4(m) \end{bmatrix},$$

$$w_1^8(6L_1 + k) = \begin{bmatrix} \alpha_1 w_1^4(n) \\ \left(\frac{-1+j}{\sqrt{2}}\right)\beta_1 w_1^4(m) \end{bmatrix},$$

$$w_1^8(7L_1 + k) = \begin{bmatrix} \alpha_1 w_1^4(n) \\ \left(\frac{-1-j}{\sqrt{2}}\right)\beta_1 w_1^4(m) \end{bmatrix}, \ldots$$

The above extensions can also be described as follows:

$$w_1^8(bL_1 + k) = \begin{bmatrix} I_{4 \times 4} & 0_{4 \times 4} \\ 0_{4 \times 4} & e^{j\frac{2\pi}{B}b} I_{4 \times 4} \end{bmatrix} w_1^8(k), \quad \text{[Equation 1-3]}$$

$$b = 1, 2, \ldots, B - 1$$

For example, B is set to 4 in order to acquire 4 times more entries.

Based on a similar approach, we can configure a 8Tx codebook for ranks 2, 3 and 4 as follows:

$$w_2^8(k) = \begin{bmatrix} \alpha_2 w_2^4(n) \\ \beta_2 w_2^4(m) \end{bmatrix}, k = 1, 2, \ldots, L_2 \quad \text{[Equation 1-4]}$$

$$w_3^8(k) = \begin{bmatrix} \alpha_3 w_3^4(n) \\ \beta_3 w_3^4(m) \end{bmatrix}, k = 1, 2, \ldots, L_3$$

-continued $$w_4^8(k) = \begin{bmatrix} \alpha_3 w_4^4(n) \\ \beta_3 w_4^4(m) \end{bmatrix}, k = 1, 2, \ldots, L_4$$

For LTE and LTE-A systems, as well as for IEEE 802.16m systems, $\alpha_2 = \beta_2 = \sqrt{4Tx}/\sqrt{8Tx} = 1/\sqrt{2}$, $\alpha_3 = \beta_3 = \sqrt{4Tx}/\sqrt{8Tx} = 1/\sqrt{2}$ and $\alpha_4 = \beta_4 = \sqrt{4Tx}/\sqrt{8Tx} = 1/\sqrt{2}$ are examples of values that may be employed.

However, the building up of a 8Tx codebook for rank 4 from the 4Tx codebook for rank 4 has no benefits, since the Chordal distance among the entries are all zeros, therefore, we can alternatively configure the 8Tx codebook for rank 4 by re-using the 4Tx codebook for rank 3 and rank 1, as explained below:

$$w_4^8(k) = \begin{bmatrix} \alpha_4 w_3^4(n) & \gamma_4 w_1^4(m) \\ \beta_4 w_3^4(n) & -\zeta_4 w_1^4(m) \end{bmatrix}, \quad [\text{Equation 1-5}]$$

$$k = 1, 2, \ldots, L_4$$

For LTE and LTE-A systems, $\alpha_4, \beta_4, \gamma_4, \zeta_4$ have the following examples:

$\alpha_4 = \beta_4 = \sqrt{4Tx \times \text{Rank3}}/\sqrt{8Tx \times \text{Rank4}} = \sqrt{3}/\sqrt{8}$, $\zeta_4 = \sqrt{4Tx \times \text{Rank1}}/\sqrt{8Tx \times \text{Rank4}} = \sqrt{1}/\sqrt{8}$ For IEEE 802.16m systems, $\alpha_4, \beta_4, \gamma_4, \zeta_4$ have the following examples:

$\alpha_4 = \beta_4 = \gamma_4 = \zeta_4 = \sqrt{4Tx}/\sqrt{8Tx} = 1/\sqrt{2}$

An alternative way to configure the 8Tx codebook for rank 4 is as follows:

$$w_4^8(k) = \begin{bmatrix} \alpha_4 w_2^4(n) & \gamma_4 w_2^4(m) \\ \beta_4 w_2^4(n) & -\zeta_4 w_2^4(m) \end{bmatrix} \quad [\text{Equation 1-6}]$$

For LTE and LTE-A systems, $\alpha_4, \beta_4, \gamma_4, \zeta_4$ have the following examples:

$\alpha_4 = \beta_4 = \gamma_4 = \zeta_4 = \sqrt{4Tx \times \text{Rank2}}/\sqrt{8Tx \times \text{Rank4}} = 1/2$ For IEEE 802.16m systems, $\alpha_4, \beta_4, \gamma_4, \zeta_4$ have the following examples:

$\alpha_4 = \beta_4 = \gamma_4 = \zeta_4 = \sqrt{4Tx}/\sqrt{8Tx} = 1/\sqrt{2}$

We can also make a 8Tx codebook for any rank that is higher than 4 in a similar manner, as follows:

$$w_5^8(k) = \begin{bmatrix} \alpha_5 w_3^4(n) & \gamma_5 w_2^4(m) \\ \beta_5 w_3^4(n) & -\zeta_5 w_2^4(m) \end{bmatrix} \quad [\text{Equation 1-7}]$$

$$w_6^8(k) = \begin{bmatrix} \alpha_6 w_3^4(n) & \gamma_6 w_3^4(m) \\ \beta_6 w_3^4(n) & -\zeta_6 w_3^4(m) \end{bmatrix}$$

$$w_7^8(k) = \begin{bmatrix} \alpha_7 w_3^4(n) & \gamma_7 w_4^4(m) \\ \beta_7 w_3^4(n) & -\zeta_7 w_4^4(m) \end{bmatrix}$$

$$w_8^8(k) = \begin{bmatrix} \alpha_8 w_4^4(n) & \gamma_8 w_4^4(m) \\ \beta_8 w_4^4(n) & -\zeta_8 w_4^4(m) \end{bmatrix}$$

For LTE and LTE-A systems, $\alpha_4, \beta_4, \gamma_4, \zeta_4, \ldots, \alpha_4, \beta_4, \gamma_4, \zeta_4$ have the following examples:

$\alpha_5 = \beta_5 = \sqrt{4Tx \times \text{Rank3}}/\sqrt{8Tx \times \text{Rank5}} = \sqrt{1}/\sqrt{2}$, $\gamma_5 = \zeta_5 = \sqrt{4Tx \times \text{Rank2}}/\sqrt{8Tx \times \text{Rank5}} = 1/\sqrt{2}$ $\alpha_6 = \beta_6 = \sqrt{4Tx \times \text{Rank3}}/\sqrt{8Tx \times \text{Rank6}} = 1/2$, $\gamma_6 = \zeta_6 = \sqrt{4Tx \times \text{Rank3}}/\sqrt{8Tx \times \text{Rank6}} = 1/2$ $\alpha_7 = \beta_7 = \sqrt{4Tx \times \text{Rank3}}/\sqrt{8Tx \times \text{Rank7}} = \sqrt{3}/\sqrt{14}$, $\gamma_7 = \zeta_7 = \sqrt{4Tx \times \text{Rank4}}/\sqrt{8Tx \times \text{Rank7}} = \sqrt{2}/\sqrt{7}$ $\alpha_8 = \beta_8 = \sqrt{4Tx \times \text{Rank4}}/\sqrt{8Tx \times \text{Rank8}} = 1/2$, $\gamma_8 = \zeta_8 = \sqrt{4Tx \times \text{Rank4}}/\sqrt{8Tx \times \text{Rank8}} = 1/2$ For IEEE 802.16m systems, $\alpha_4, \beta_4, \gamma_4, \zeta_4, \ldots, \alpha_8, \beta_8, \gamma_8, \zeta_8$ have the following example:

$\alpha_R = \beta_R = \gamma_R = \zeta_R = \sqrt{4Tx}/\sqrt{8Tx} = 1/\sqrt{2}$, R=5, 6, 7, 8

The simplest example to configure the 8Tx codebook for ranks 5-8 is to set as m=n=k. The extension rule used in [Equations 1-2 to 1-3] can be also applied to [Equations 1-4 to 1-7].

Parts of the 8Tx codebook per each rank can contain at least some of the entries created by the above-mentioned methods.

It can be understood that the features, equations and procedures described above can also be applied to configure a codebook of any dimension, such as a codebook for 16Tx.

In other words, a higher dimensional codebook can be configured by using its related lower dimensional codebook. For example, a 8Tx codebook can be configured by using a 4Tx codebook. The 8Tx codebook for a rank lower than 4 can be made with the entries of 4Tx codebook for the corresponding rank. On the other hand, a 8Tx codebook for a rank higher than or equal to 4 can be made by using the entries of the 4Tx codebook for a rank less than 4. For example, a 8Tx codebook for rank 4 can be configured by using the 4Tx codebooks for rank 3 and rank 1. Accordingly, the inventive concepts derived by the present inventors can be used for configuration of higher dimensional codebooks based on a lower dimensional codebook, which results in easier codebook design and reduces the required memory for the UE (or MS).

(2) Configuration of 8Tx Codebook Using 4Tx Codebook for Rank 1

Given a 4Tx codebook, the 8Tx codebook can be easily configured by re-use of the 4Tx codebook. For example, to build a 8Tx codebook for rank 1, the following method is used:

$$w_1^8(k) = \begin{bmatrix} \alpha_1 w_1^4(n) \\ \beta_1 w_1^4(m) \end{bmatrix}, k = 0, 1, \ldots, L_1 - 1 \quad [\text{Equation 2-1}]$$

whereby if n=m=k, then:

$$w_1^8(k) = \alpha_1 \begin{bmatrix} w_1^4(k) \\ w_1^4(k) \end{bmatrix}, k = 0, 1, \ldots, L_1 - 1$$

For configuration of a 8Tx codebook for rank 2, the following can be utilized:

$$w_2^8(k) = \begin{bmatrix} \alpha_{2,1} w_1^4(n_1) & \alpha_{2,2} w_1^4(n_2) \\ e^{j\theta(k)} \beta_{2,1} w_1^4(m_1) & -e^{j\theta(k)} \beta_{2,2} w_1^4(m_2) \end{bmatrix},$$
$$k = 0, 1, \ldots, L_2 - 1$$
[Equation 2-2]

The simplest example is to make a codebook for rank 2 is as follows:

$$w_2^8(k) = \alpha_2 \begin{bmatrix} w_1^4(k) & w_1^4(k) \\ w_1^4(k) & -w_1^4(k) \end{bmatrix}, \quad k = 0, 1, \ldots, L_2 - 1$$

For configuration of a 8Tx codebook for rank 3, the following way can be utilized:

$$w_3^8(k) = \begin{bmatrix} \alpha_{3,1} w_1^4(n_1) & \alpha_{3,2} w_1^4(n_2) & \alpha_{3,3} w_1^4(n_3) \\ e^{j\theta(k)} \beta_{3,1} w_1^4(m_1) & -e^{j\theta(k)} \beta_{3,2} w_1^4(m_2) & \beta_{3,3} w_1^4(m_3) \end{bmatrix}$$
[Equation 2-3]
$$k = 0, 1, \ldots, L_3 - 1$$

The simplest example is to make a codebook for rank 2 is as follows:

$$w_3^8(k) = \alpha_3 \begin{bmatrix} w_1^4(k) & w_1^4(k) & w_1^4(m) \\ w_1^4(k) & -w_1^4(k) & w_1^4(m) \end{bmatrix}, \quad k = 0, 1, \ldots, L_3 - 1$$

where $(w_1^4(k))^H w_1^4(m) = 0$.

Through a similar approach, we can make 8Tx codebooks for ranks 4-8, as per the following simple examples:

$$w_4^8(k) = \alpha_4 \begin{bmatrix} w_1^4(k) & w_1^4(k) & w_1^4(m) & w_1^4(m) \\ w_1^4(k) & -w_1^4(k) & w_1^4(m) & -w_1^4(m) \end{bmatrix},$$
[Equation 2-4]
$$k = 0, 1, \ldots, L_4 - 1.$$

$$w_5^8(k) = \alpha_5 \begin{bmatrix} w_1^4(k) & w_1^4(k) & w_1^4(m) & w_1^4(m) & w_1^4(n) \\ w_1^4(k) & -w_1^4(k) & w_1^4(m) & -w_1^4(m) & w_1^4(n) \end{bmatrix},$$
[Equation 2-5]
$$k = 0, 1, \ldots, L_5 - 1.$$

$$w_6^8(k) = \alpha_6 \begin{bmatrix} w_1^4(k) & w_1^4(k) & w_1^4(m) & w_1^4(m) & w_1^4(n) & w_1^4(n) \\ w_1^4(k) & -w_1^4(k) & w_1^4(m) & -w_1^4(m) & w_1^4(n) & -w_1^4(n) \end{bmatrix},$$
[Equation 2-6]
$$k = 0, 1, \ldots, L_6 - 1.$$

$$w_7^8(k) = \alpha_7 \begin{bmatrix} w_1^4(k) & w_1^4(k) & w_1^4(m) & w_1^4(m) & w_1^4(n) & w_1^4(n) & w_1^4(l) \\ w_1^4(k) & -w_1^4(k) & w_1^4(m) & -w_1^4(m) & w_1^4(n) & -w_1^4(n) & w_1^4(l) \end{bmatrix},$$
[Equation 2-7]
$$k = 0, 1, \ldots, L_7 - 1.$$

$$w_8^8(k) = \alpha_7 \begin{bmatrix} w_1^4(k) & w_1^4(k) & w_1^4(m) & w_1^4(m) & w_1^4(n) & w_1^4(n) & w_1^4(l) & w_1^4(l) \\ w_1^4(k) & -w_1^4(k) & w_1^4(m) & -w_1^4(m) & w_1^4(n) & -w_1^4(n) & w_1^4(l) & -w_1^4(l) \end{bmatrix},$$
[Equation 2-8]
$$k = 0, 1, \ldots, L_8 - 1$$

where $w_1^4(k)$, $w_1^4(m)$ $w_1^4(n)$ and $w_1^4(l)$ are orthogonal.

Another example is to use the phase rotation in one row or column, as shown below:

$$w_2^8(k) = \alpha_2 \begin{bmatrix} w_1^4(k) & w_1^4(k) \\ j w_1^4(k) & -j w_1^4(k) \end{bmatrix}.$$

In the above-mentioned method, we can configure a 8Tx codebook from a lower rank to a higher rank using the 4Tx codebook for rank 1. On the contrary, we can start as from a 8Tx codebook for a higher rank. That means, we can build a 8Tx codebook for rank 8 as per Equation 2-8, and then extract the proper columns corresponding to the rank. For example, based on a 8Tx codebook for rank 8 (as in Equation 2-8), a 8Tx codebook for rank 1 can be configured by using the first column of each matrix of the 8Tx codebook for rank 8. Similarly, a 8Tx codebook for rank 2 can be made by using the first and second columns of each matrix of the 8Tx codebook for rank 8.

The particular size of the codebook for each rank can be different, e.g., the codebook for rank 1 and rank 2 have 64 and 32 entries (or bits), respectively, while the size of the codebook for ranks 3 through 8 are of 4 bits. To enlarge the codebook size for rank 1, we can employ the following exemplary method:

$$\alpha_1 \begin{bmatrix} w_1^4(k) \\ w_1^4(k) \end{bmatrix} \Rightarrow \left\{ \alpha_1 \begin{bmatrix} w_1^4(k) \\ w_1^4(k) \end{bmatrix}, \alpha_1 \begin{bmatrix} w_1^4(k) \\ -w_1^4(k) \end{bmatrix}, \alpha_1 \begin{bmatrix} w_1^4(k) \\ j w_1^4(k) \end{bmatrix}, \alpha_1 \begin{bmatrix} w_1^4(k) \\ -j w_1^4(k) \end{bmatrix} \right\}$$

As in rank 1, the identical approach can be used to enlarge the codebook size for rank 2:

$$\alpha_2 \begin{bmatrix} w_1^A(k) & w_1^A(k) \\ w_1^A(k) & -w_1^A(k) \end{bmatrix} \Rightarrow \left\{ \alpha_2 \begin{bmatrix} w_1^A(k) & w_1^A(k) \\ w_1^A(k) & -w_1^A(k) \end{bmatrix}, \alpha_2 \begin{bmatrix} w_1^A(k) & w_1^A(k) \\ jw_1^A(k) & -jw_1^A(k) \end{bmatrix} \right\}$$

Parts of the 8Tx codebook per each rank can contain at least some of the entries created by the above-mentioned methods. Thus, the concepts of procedure (2) can be applied to configure codebook of any dimension such as 16Tx.

(3) IEEE 802.16m 8Tx codebook With respect to the codebooks for 2Tx, 4Tx, and 8Tx CL-MIMO schemes, usually, the required codebook size per rank increases as the number of transmit antennas becomes larger. For example, the 2Tx rank 1 codebook of size 3 bits is adopted, while the 4Tx rank 1 codebook of size 6 bits is specified. However, a 8Tx codebook size per rank of only 4 bits would not be enough to support transmit antennas of a larger dimension.

By further employing the gain from 8Tx CL-MIMO, this procedure (3) provides a new 8Tx codebook of even larger size that is obtained by re-using the 4Tx codebook.

To configure a 8Tx codebook of a larger size, re-use of the 4Tx codebook having a size 6 bits may be the simplest to implement. The re-use of the 4Tx codebook has two advantages; namely, (1) the MS does not need additional memory for the 8Tx codebook since it already has a 4Tx codebook stored therein, and (2) easy extensions to larger codebooks can be performed. The configuration of the 8Tx codebook of 8 bits can be derived from the subset of 4Tx codebook, in the following manner:

$$C(8, 1, 8, m) = \frac{1}{\sqrt{2}} \begin{bmatrix} C(4, 1, 6, \text{floor}(m/16)) \\ C(4, 1, 6, \text{mod}(m, 16)) \end{bmatrix},$$
$$m = 0, 1, \ldots, 255$$

$$C(8, 2, 8, m) = \frac{1}{\sqrt{2}} \begin{bmatrix} C(4, 2, 6, \text{floor}(m/16)) \\ C(4, 2, 6, \text{mod}(m, 16)) \end{bmatrix},$$
$$m = 0, 1, \ldots, 255$$

$$C(8, 3, 4, m) = \frac{1}{\sqrt{2}} \begin{bmatrix} C(4, 3, 6, m) \\ C(4, 3, 6, m) \end{bmatrix},$$
$$m = 0, 1, \ldots, 15$$

$$C(8, 4, 4, m) = \frac{1}{\sqrt{2}} \begin{bmatrix} C(4, 3, 6, m) & C(4, 1, 6, m) \\ C(4, 3, 6, m) & -C(4, 1, 6, m) \end{bmatrix},$$
$$m = 0, 1, \ldots, 15$$

$$C(8, 5, 4, m) = \frac{1}{\sqrt{2}} \begin{bmatrix} C(4, 3, 6, m) & C(4, 2, 6, m) \\ C(4, 3, 6, m) & -C(4, 2, 6, m) \end{bmatrix},$$
$$m = 0, 1, \ldots, 15$$

$$C(8, 6, 4, m) = \frac{1}{\sqrt{2}} \begin{bmatrix} C(4, 3, 6, m) & C(4, 3, 6, m) \\ C(4, 3, 6, m) & -C(4, 3, 6, m) \end{bmatrix},$$
$$m = 0, 1, \ldots, 15$$

$$C(8, 7, 3, m) = \frac{1}{\sqrt{2}} \begin{bmatrix} C(4, 3, 6, m) & C(4, 4, 6, m) \\ C(4, 3, 6, m) & -C(4, 4, 6, m) \end{bmatrix},$$
$$m = 0, 1, \ldots, 5$$

$$C(8, 8, 3, m) = \frac{1}{\sqrt{2}} \begin{bmatrix} C(4, 4, 6, m) & C(4, 4, 6, m) \\ C(4, 4, 6, m) & -C(4, 4, 6, m) \end{bmatrix},$$
$$m = 0, 1, \ldots, 5$$

The resulting codebook exhibits the required properties, such as having unitary matrices and a nested structure. A codebook of 6 bits can be constructed in an identical manner, as in that used to construct the codebook of 8 bits. For rank 1 through rank 2, the codebook of 6 bits is configured by using a subset(s) of 4Tx codebook, as shown in the following example:

$$C(8, 1, 6, m) = \begin{cases} \frac{1}{\sqrt{2}} \begin{bmatrix} C(4, 1, 6, m) \\ C(4, 1, 6, m) \end{bmatrix}, m = 0, 1, \ldots, 15 \\ \frac{1}{\sqrt{2}} \begin{bmatrix} C(4, 1, 6, m-16) \\ -C(4, 1, 6, m-16) \end{bmatrix}, m = 16, 17, \ldots, 31 \\ \frac{1}{\sqrt{2}} \begin{bmatrix} C(4, 1, 6, m-32) \\ jC(4, 1, 6, m-32) \end{bmatrix}, m = 32, 33, \ldots, 47 \\ \frac{1}{\sqrt{2}} \begin{bmatrix} C(4, 1, 6, m-48) \\ -jC(4, 1, 6, m-48) \end{bmatrix}, m = 48, 49, \ldots, 63 \end{cases}$$

$$C(8, 2, 6, m) = \begin{cases} \frac{1}{\sqrt{2}} \begin{bmatrix} C(4, 2, 6, m) \\ C(4, 2, 6, m) \end{bmatrix}, m = 0, 1, \ldots, 15 \\ \frac{1}{\sqrt{2}} \begin{bmatrix} C(4, 2, 6, m-16) \\ -C(4, 2, 6, m-16) \end{bmatrix}, m = 16, 17, \ldots, 31 \\ \frac{1}{\sqrt{2}} \begin{bmatrix} C(4, 2, 6, m-32) \\ jC(4, 2, 6, m-32) \end{bmatrix}, m = 32, 33, \ldots, 47 \\ \frac{1}{\sqrt{2}} \begin{bmatrix} C(4, 2, 6, m-48) \\ -jC(4, 2, 6, m-48) \end{bmatrix}, m = 48, 49, \ldots, 63 \end{cases}$$

Figure 4:
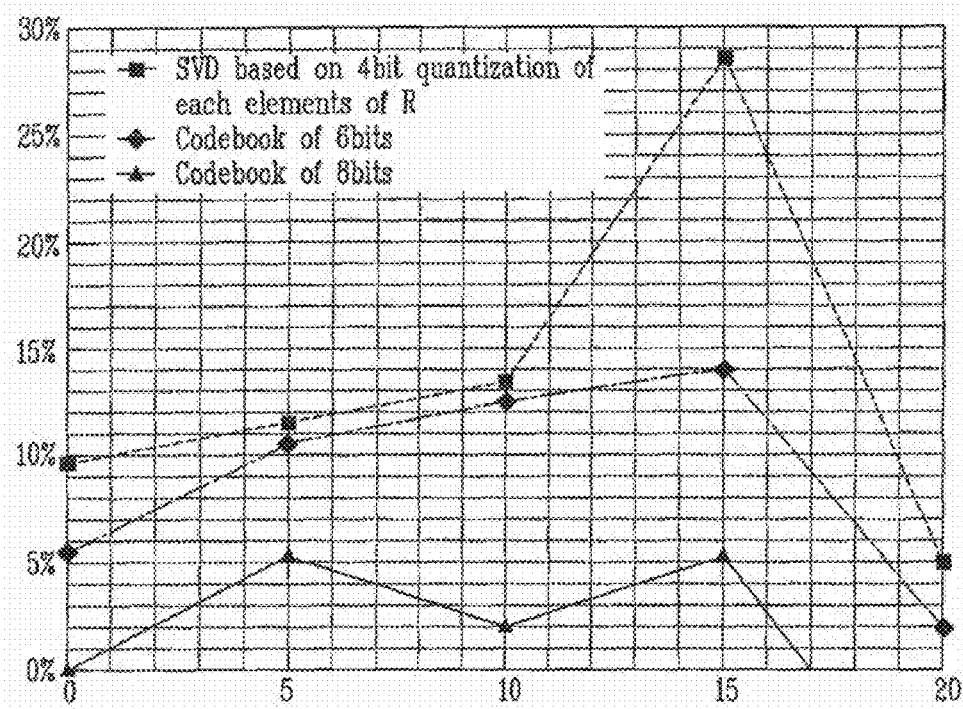
FIG. 4 shows some exemplary link throughput gains of the newly proposed codebook in contrast to using an AWD (Amended Working Document) codebook in the uncorrelated case.

FIG. 4 shows some exemplary link throughput gains of the currently proposed codebook over the known AWD codebook in the uncorrelated case. In this simulation, 8Tx-2Rx CL-MIMO based on codebook under Ped-B 3 km/h was evaluated. The time periods of PMI feedback, CQI feedback, band selection and rank adaptation are 5 ms, 5 ms, 40 ms, and 40 ms, respectively. Given these results, a codebook size of at least 8 bits may be needed in order to achieve comparable precoding gain, as in the SVD based approach.

Figure 5:
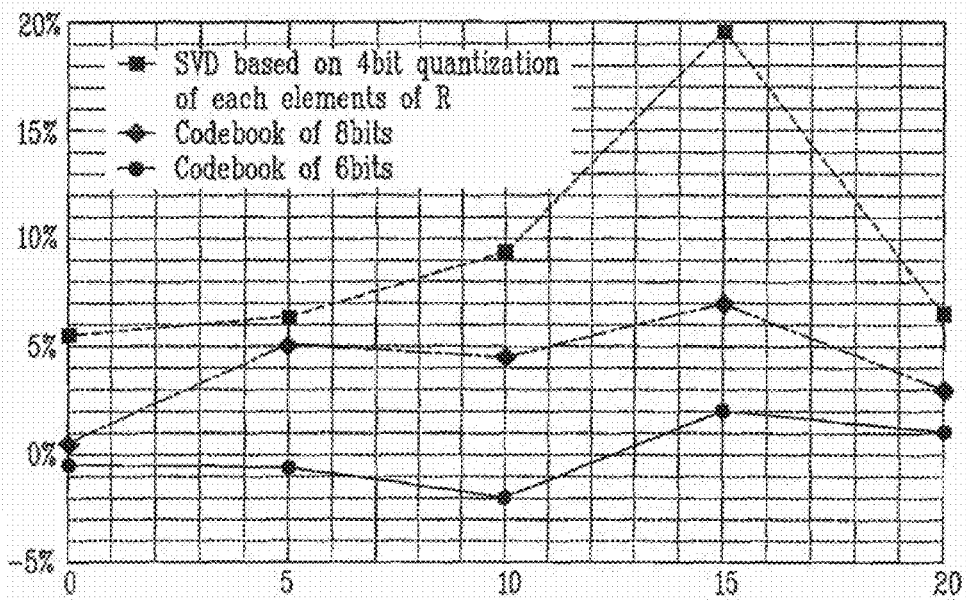
FIG. 5 shows some more exemplary link throughput gains of the newly proposed codebook in contrast to using an AWD codebook in the correlated case (Tx corr.=0.5).

FIG. 5 shows the exemplary link throughput gain of the proposed codebook over the known AWD codebook in a correlated case (Tx corr.=0.5). Namely, FIG. 5 presents the throughput gain from using a codebook of 8 bits and 6 bits in comparison to using an AWD codebook in a correlated environment.

Figure 6:
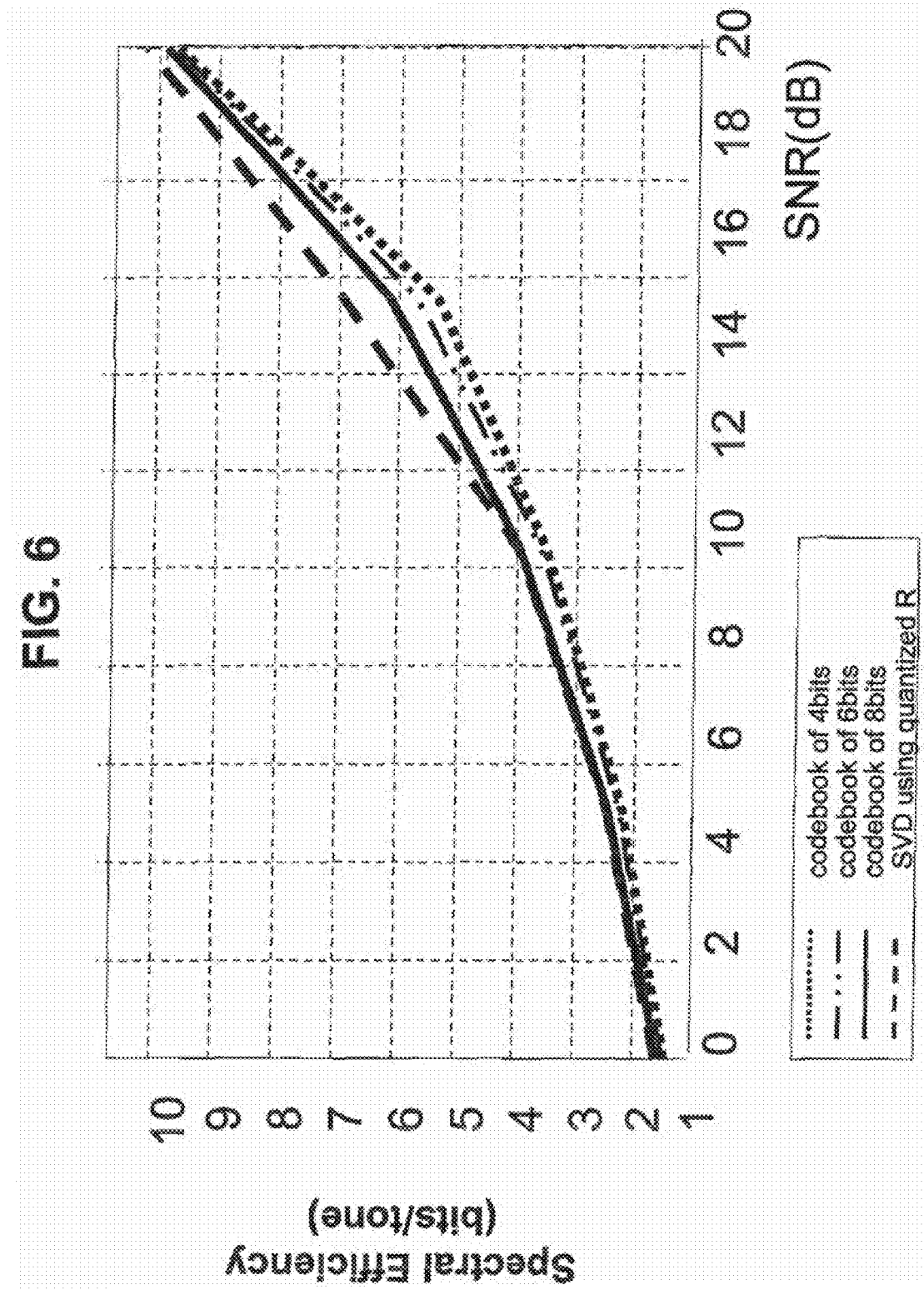
FIG. 6 shows an exemplary shows some exemplary experimental results, in terms of spectral efficiency (bits/tone) versus signal-to-noise ratio (SNR) (dB), when using codebooks of 4 bits, 6 bits, 8 bits and using an AWD codebook.

Referring to FIG. 6, which shows some exemplary experimental results in terms of spectral efficiency indicated in terms of bits/tone versus signal-to-noise ratio (SNR) indicated in terms of decibels (dB), use of a codebook of 6 bits does not provide much performance gain compared to when a codebook of 4 bits is used, but the newly proposed codebook of 8 bits still outperforms the AWD codebook by about 5% on average.

If UL feedback overhead for 8Tx CL-MIMO should be equal or less than that of 4Tx CL-MIMO to make a simple implementation, then 6 bits is more desirable than 8 bits. Otherwise, codebook of 8 bits is recommended for 8Tx codebook based CL-MIMO in order to make significant benefits in downlink throughput at a cost of slightly increased UL feedback overhead.

The following codebook entries may be appended to the currently proposed 8Tx codebook of 4 bits:

$$C(8, 1, 6, m) = \begin{cases} C(8, 1, 4, m), & m = 0, 1, \ldots, 15 \\ \frac{1}{\sqrt{2}} \begin{bmatrix} C(4, 1, 6, m) \\ C(4, 1, 6, m) \end{bmatrix}, & m = 16, 17, \ldots, 63 \end{cases}$$

$$C(8, 2, 6, m) = \begin{cases} C(8, 2, 4, m), & m = 0, 1, \ldots, 15 \\ \frac{1}{\sqrt{2}} \begin{bmatrix} C(4, 2, 6, m) \\ C(4, 2, 6, m) \end{bmatrix}, & m = 16, 17, \ldots, 63 \end{cases}$$

The above procedure (3) may be summarized as being related to a base codebook for eight transmit antennas, in particular, a SU-MIMO base codebook. Namely, the base codebook can be constructed from a base codebook for four transmit antennas in the following manner:

$$C(8, 1, 8, m) = \frac{1}{\sqrt{2}} \begin{bmatrix} C(4, 1, 6, \text{floor}(m/16)) \\ C(4, 1, 6, \text{mod}(m, 16)) \end{bmatrix},$$

$m = 0, 1, \ldots, 255$ $$C(8, 2, 8, m) = \frac{1}{\sqrt{2}} \begin{bmatrix} C(4, 2, 6, \text{floor}(m/16)) \\ C(4, 2, 6, \text{mod}(m, 16)) \end{bmatrix},$$

$m = 0, 1, \ldots, 255$ $$C(8, 3, 4, m) = \frac{1}{\sqrt{2}} \begin{bmatrix} C(4, 3, 6, m) \\ C(4, 3, 6, m) \end{bmatrix},$$

$m = 0, 1, \ldots, 15$ $$C(8, 4, 4, m) = \frac{1}{\sqrt{2}} \begin{bmatrix} C(4, 3, 6, m) & C(4, 1, 6, m) \\ C(4, 3, 6, m) & -C(4, 1, 6, m) \end{bmatrix},$$

$m = 0, 1, \ldots, 15$ $$C(8, 5, 4, m) = \frac{1}{\sqrt{2}} \begin{bmatrix} C(4, 3, 6, m) & C(4, 2, 6, m) \\ C(4, 3, 6, m) & -C(4, 2, 6, m) \end{bmatrix},$$

$m = 0, 1, \ldots, 15$ $$C(8, 6, 4, m) = \frac{1}{\sqrt{2}} \begin{bmatrix} C(4, 3, 6, m) & C(4, 3, 6, m) \\ C(4, 3, 6, m) & -C(4, 3, 6, m) \end{bmatrix},$$

$m = 0, 1, \ldots, 15$ $$C(8, 7, 3, m) = \frac{1}{\sqrt{2}} \begin{bmatrix} C(4, 3, 6, m) & C(4, 4, 6, m) \\ C(4, 3, 6, m) & -C(4, 4, 6, m) \end{bmatrix},$$

$m = 0, 1, \ldots, 5$ $$C(8, 8, 3, m) = \frac{1}{\sqrt{2}} \begin{bmatrix} C(4, 4, 6, m) & C(4, 4, 6, m) \\ C(4, 4, 6, m) & -C(4, 4, 6, m) \end{bmatrix},$$

$m = 0, 1, \ldots, 5$

It can be understood that the above codebook features are applicable to IEEE 802.16m, 3GPP LTE, 3GPP LTE-Advanced, and the like.

(4) DL Codebook for 8Tx Precoding

In order to achieve significant downlink spectral efficiency, up to an 8Tx antenna scheme should be supported in the downlink for LTE-Advanced systems. In particular, because the major throughput via the downlink comes from the CL-MIMO operation, it would be straightforward to employ CL-MIMO in the 8Tx antenna scheme. There are two approaches to accomplish CL-MIMO for the 8Tx antenna case in FDD; one being based on the codebook as in the LTE system, and the other is based on CSI direct feedback.

The procedure (4) focuses on the codebook based scheme and proposes a new codebook for the 8Tx antenna scheme.

Regarding the guidelines for such codebook design, several criteria based upon the release 8 (Rel-8) system design need to be considered and the 8Tx codebook should satisfy at least the following properties: 1) constant modulus property, 2) finite alphabet, 3) good performance for various cases such as highly correlated, uncorrelated and cross polarized antenna configuration, 4) moderate codebook size, and 5) nested property.

This procedure (4) proposes a new codebook for a 8Tx antenna system that is configured from the existing codebook for the Re1-8 4Tx transmission scheme. First, two base matrices using the Re1-8 4Tx codebook for rank 1 transmission are used; the two base matrices being:

$$A_1 = \frac{1}{\sqrt{2}} \begin{bmatrix} W_0^{\{1\}} & W_1^{\{1\}} & W_2^{\{1\}} & W_3^{\{1\}} & W_4^{\{1\}} & W_5^{\{1\}} & W_6^{\{1\}} & W_7^{\{1\}} \\ W_0^{\{1\}} & W_1^{\{1\}} & W_2^{\{1\}} & W_3^{\{1\}} & -W_4^{\{1\}} & -W_5^{\{1\}} & -W_6^{\{1\}} & -W_7^{\{1\}} \end{bmatrix}$$

$A_2 = \Phi A_1$ where $$\Phi = \begin{bmatrix} 1 & 0 & \cdots & 0 \\ 0 & e^{j\pi/8} & \cdots & 0 \\ \vdots & \vdots & \ddots & \vdots \\ 0 & 0 & \cdots & e^{j7\pi/8} \end{bmatrix}.$$

Configuration of 8Tx codebook from the base matrices using 4Tx codebook guarantees the aforementioned properties 1) and 2). For property 4), a codebook with a 4 bit size will be initially considered. All of the entries of such codebook are extracted from the base matrices such that property 5) is satisfied.

The following Table 1 shows some exemplary entries in a 4-bit codebook that is used for 8Tx precoding: (The columns indices of the base matrices are shown in brackets.)

| Index | Rank 1 | Rank 2 | Rank 3 | Rank 4 | Rank 5 | Rank 6 | Rank 7 | Rank 8 |
|---|---|---|---|---|---|---|---|---|
| 0 | $A_1(1)$ | $A_1(15)$ | $A_1(125)$ | $A_1(1256)$ | $A_1(12356)$ | $A_1(123567)$ | $A_1(1234567)$ | $A_1(12345678)$ |
| 1 | $A_1(2)$ | $A_1(26)$ | $A_1(236)$ | $A_1(2367)$ | $A_1(23647)$ | $A_1(236478)$ | $A_1(2361478)$ | $A_2(12345678)$ |
| 2 | $A_1(3)$ | $A_1(37)$ | $A_1(347)$ | $A_1(3478)$ | $A_1(34718)$ | $A_1(347185)$ | $A_1(3472185)$ | |
| 3 | $A_1(4)$ | $A_1(48)$ | $A_1(418)$ | $A_1(4185)$ | $A_1(41825)$ | $A_1(418256)$ | $A_1(4183256)$ | |
| 4 | $A_1(5)$ | $A_1(52)$ | $A_1(562)$ | $A_1(5623)$ | $A_1(56273)$ | $A_1(562734)$ | $A_1(5628734)$ | — |
| 5 | $A_1(6)$ | $A_1(63)$ | $A_1(673)$ | $A_1(6734)$ | $A_1(67384)$ | $A_1(673841)$ | $A_1(6735841)$ | — |
| 6 | $A_1(7)$ | $A_1(74)$ | $A_1(784)$ | $A_1(7841)$ | $A_1(78451)$ | $A_1(784512)$ | $A_1(7846512)$ | — |
| 7 | $A_1(8)$ | $A_1(81)$ | $A_1(851)$ | $A_1(8512)$ | $A_1(85162)$ | $A_1(851623)$ | $A_1(8517623)$ | — |
| 8 | $A_2(1)$ | $A_2(15)$ | $A_2(125)$ | $A_2(1256)$ | $A_2(12356)$ | $A_2(123567)$ | $A_2(1234567)$ | — |
| 9 | $A_2(2)$ | $A_2(26)$ | $A_2(236)$ | $A_2(2367)$ | $A_2(23647)$ | $A_2(236478)$ | $A_2(2361478)$ | — |
| 10 | $A_2(3)$ | $A_2(37)$ | $A_2(347)$ | $A_2(3478)$ | $A_2(34718)$ | $A_2(347185)$ | $A_2(3472185)$ | — |

-continued

| Index | Rank 1 | Rank 2 | Rank 3 | Rank 4 | Rank 5 | Rank 6 | Rank 7 | Rank 8 |
|---|---|---|---|---|---|---|---|---|
| 11 | $A_2(4)$ | $A_2(48)$ | $A_2(418)$ | $A_2(4185)$ | $A_2(41825)$ | $A_2(418256)$ | $A_2(4183256)$ | — |
| 12 | $A_2(5)$ | $A_2(52)$ | $A_2(562)$ | $A_2(5623)$ | $A_2(56273)$ | $A_2(562734)$ | $A_2(5628734)$ | — |
| 13 | $A_2(6)$ | $A_2(63)$ | $A_2(673)$ | $A_2(6734)$ | $A_2(67384)$ | $A_2(673841)$ | $A_2(6735841)$ | — |
| 14 | $A_2(7)$ | $A_2(74)$ | $A_2(784)$ | $A_2(7841)$ | $A_2(78451)$ | $A_2(784512)$ | $A_2(7846512)$ | — |
| 15 | $A_2(8)$ | $A_2(81)$ | $A_2(851)$ | $A_2(8512)$ | $A_2(85162)$ | $A_2(851623)$ | $A_2(8517623)$ | — |

Also, the following Table 2 shows some alternative exemplary entries in a 4-bit codebook that is used for 8Tx precoding: (The columns indices of the base matrices are shown in brackets.)

in Table 2 (shown below). Another example of forming codebook entries for odd ranks is by mixing an even number of columns of B1 and/or B2 and an odd number of columns of A1 and/or A2.

| Index | Rank 1 | Rank 2 | Rank 3 | Rank 4 | Rank 5 | Rank 6 | Rank 7 | Rank 8 |
|---|---|---|---|---|---|---|---|---|
| 0 | $A_1(1)$ | $A_1(15)$ | $A_1(125)$ | $A_1(1256)$ | $A_1(12356)$ | $A_1(123567)$ | $A_1(1234567)$ | $A_1(12345678)$ |
| 1 | $A_1(2)$ | $A_1(26)$ | $A_1(236)$ | $A_1(2367)$ | $A_1(23647)$ | $A_1(236478)$ | $A_1(2361478)$ | $A_2(12345678)$ |
| 2 | $A_1(3)$ | $A_1(37)$ | $A_1(347)$ | $A_1(3478)$ | $A_1(34718)$ | $A_1(347185)$ | $A_1(3472185)$ | $B_1(12345678)$ |
| 3 | $A_1(4)$ | $A_1(48)$ | $A_1(418)$ | $A_1(4185)$ | $A_1(41825)$ | $A_1(418256)$ | $A_1(4183256)$ | $B_2(12345678)$ |
| 4 | $A_1(5)$ | $A_1(52)$ | $A_1(562)$ | $A_1(5623)$ | $A_1(56273)$ | $A_1(562734)$ | $A_1(5628734)$ | — |
| 5 | $A_1(6)$ | $A_1(63)$ | $A_1(673)$ | $A_1(6734)$ | $A_1(67384)$ | $A_1(673841)$ | $A_1(6735841)$ | — |
| 6 | $A_1(7)$ | $A_1(74)$ | $A_1(784)$ | $A_1(7841)$ | $A_1(78451)$ | $A_1(784512)$ | $A_1(7846512)$ | — |
| 7 | $A_1(8)$ | $A_1(81)$ | $A_1(851)$ | $A_1(8512)$ | $A_1(85162)$ | $A_1(851623)$ | $A_1(8517623)$ | — |
| 8 | $A_2(1)$ | $B_1(15)$ | $A_2(125)$ | $B_1(1256)$ | $A_2(12356)$ | $B_1(123567)$ | $A_2(1234567)$ | — |
| 9 | $A_2(2)$ | $B_1(26)$ | $A_2(236)$ | $B_1(2367)$ | $A_2(23647)$ | $B_1(236478)$ | $A_2(2361478)$ | — |
| 10 | $A_2(3)$ | $B_1(37)$ | $A_2(347)$ | $B_1(3478)$ | $A_2(34718)$ | $B_1(347185)$ | $A_2(3472185)$ | — |
| 11 | $A_2(4)$ | $B_1(48)$ | $A_2(418)$ | $B_1(4185)$ | $A_2(41825)$ | $B_1(418256)$ | $A_2(4183256)$ | — |
| 12 | $A_2(5)$ | $B_2(15)$ | $A_2(562)$ | $B_2(1256)$ | $A_2(56273)$ | $B_2(123567)$ | $A_2(5628734)$ | — |
| 13 | $A_2(6)$ | $B_2(26)$ | $A_2(673)$ | $B_2(2367)$ | $A_2(67384)$ | $B_2(236478)$ | $A_2(6735841)$ | — |
| 14 | $A_2(7)$ | $B_2(37)$ | $A_2(784)$ | $B_2(3478)$ | $A_2(78451)$ | $B_2(347185)$ | $A_2(7846512)$ | — |
| 15 | $A_2(8)$ | $B_2(48)$ | $A_2(851)$ | $B_2(4185)$ | $A_2(85162)$ | $B_2(418256)$ | $A_2(8517623)$ | — |

However, to satisfy property 3), it is desirable to introduce different base matrices, such as B1 and B2 (shown below), which are more proper for a cross polarized antenna configuration than the previous base matrices A1 and A2 shown above:

$$B_1 = P^T \begin{bmatrix} w_0^{[1]} & w_1^{[1]} & w_2^{[1]} & w_3^{[1]} & 0 & 0 & 0 & 0 \\ 0 & 0 & 0 & 0 & w_0^{[1]} & w_1^{[1]} & w_2^{[1]} & w_3^{[1]} \end{bmatrix} P$$

$$B_2 = P^T \begin{bmatrix} w_4^{[1]} & w_5^{[1]} & w_6^{[1]} & w_7^{[1]} & 0 & 0 & 0 & 0 \\ 0 & 0 & 0 & 0 & w_4^{[1]} & w_5^{[1]} & w_6^{[1]} & w_7^{[1]} \end{bmatrix} P$$

where $P=[e_1\ e_5\ e_2\ e_6\ e_3\ e_7\ e_4\ e_8]$ and $e_k$ means unit vector having non-zero value for k-th element.

Figure 7:
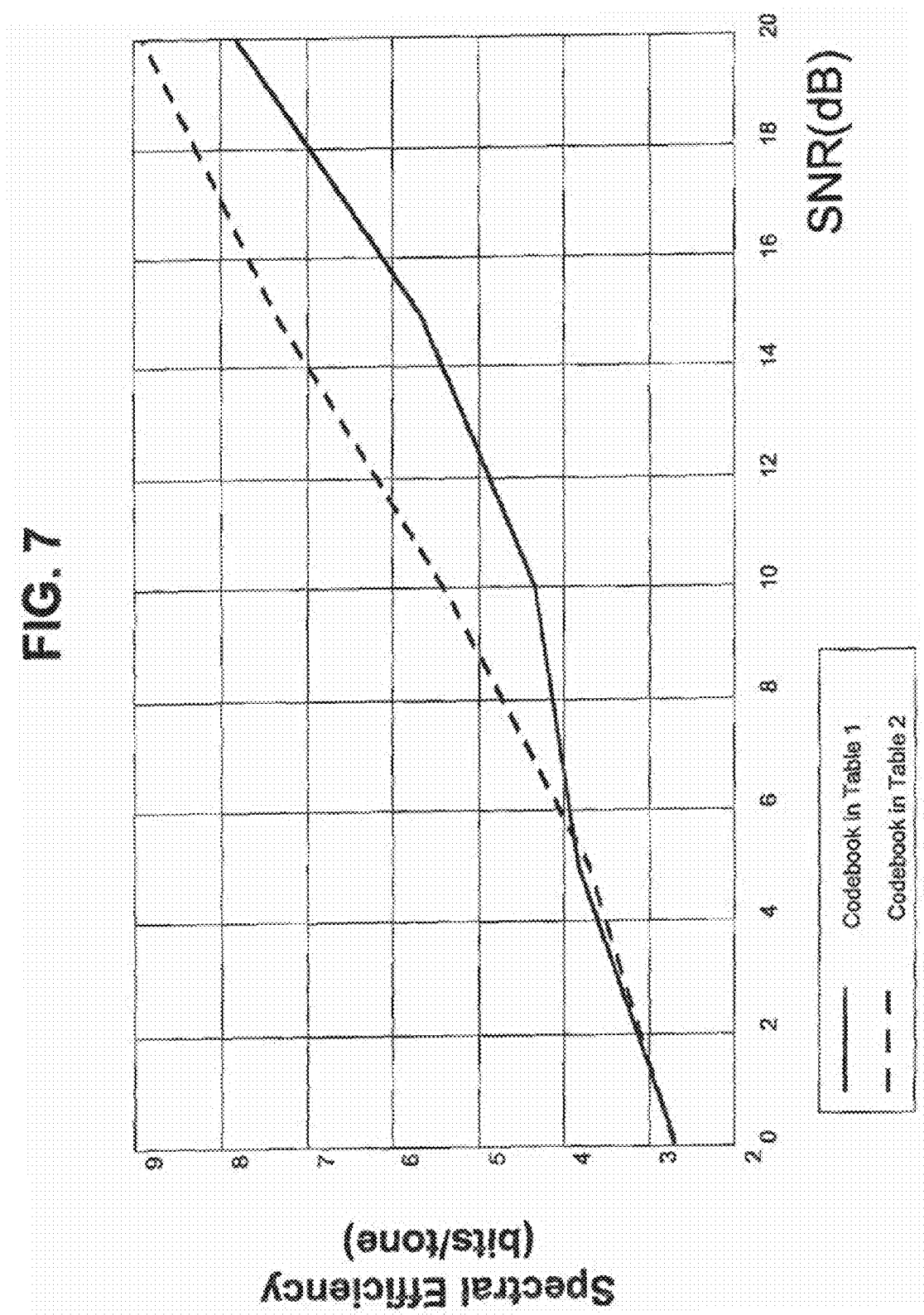
FIG. 7 shows some exemplary performance comparison results from employing base matrices B1 and B2 of the present disclosure for a cross-polarized antenna case.
Figure 8:
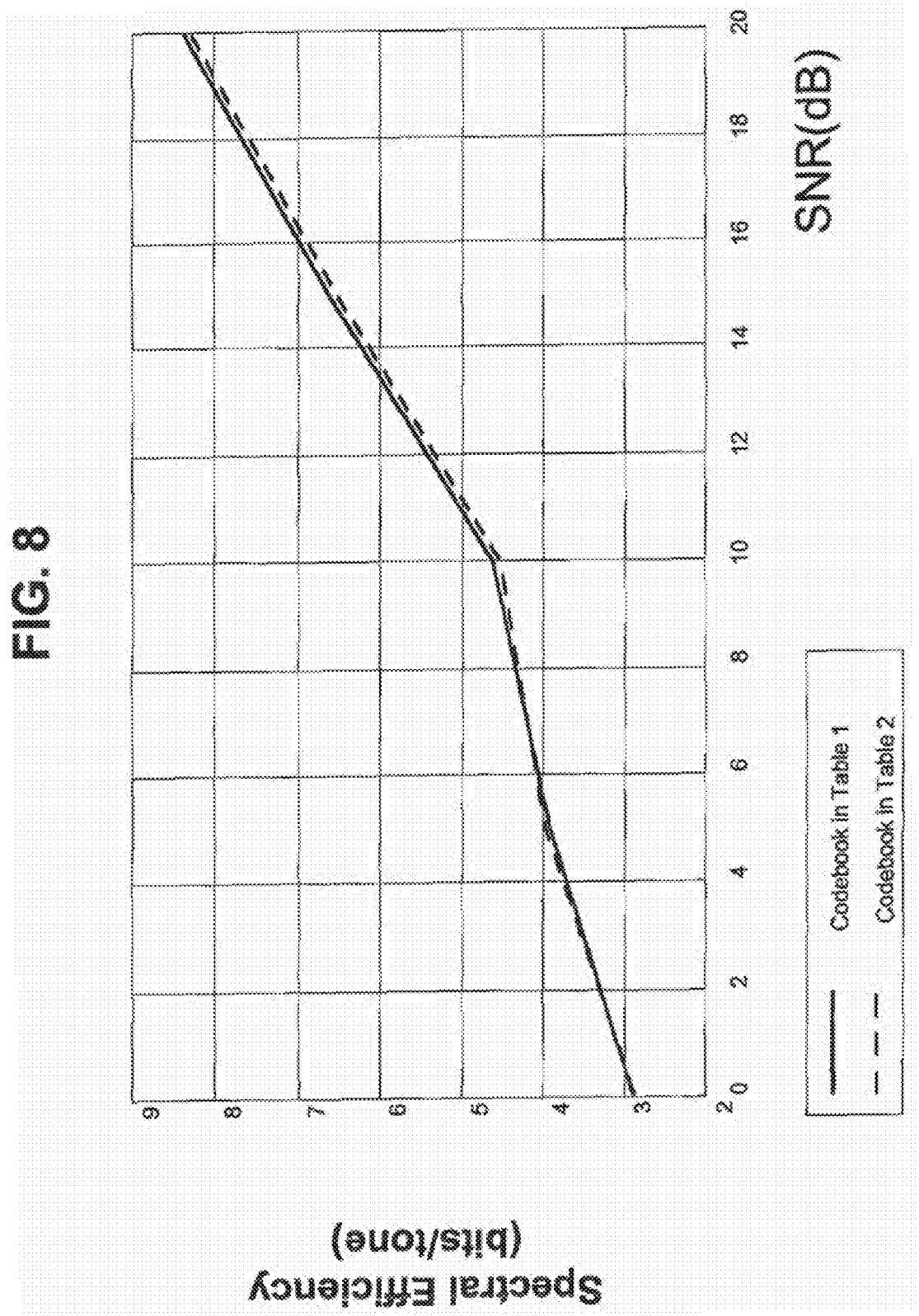
FIG. 8 shows that the performance loss by B1 and B2 under highly correlation ULA is very negligible.

Even though property 5) is partially unsatisfied (or broken), the performance gain from employing base matrices B1 and B2 are considerable as shown in FIG. 7, which shows some performance comparison results for a cross polarized antenna case. On the other hand, FIG. 8 shows that the performance loss by B1 and B2 under highly correlation ULA is very negligible.

The base matrices B1 and/or B2 can be replaced with any block diagonal matrix or its permuted version. The matrices A1 and/or A2 can be replaced with any unitary matrix containing no zero elements. When designing the codebook using these base matrices A1 through B2, the codebook entries for odd ranks (i.e., rank 1, 3, 5 and 7) can be configured by using A1 and A2, while entries for even ranks (i.e., rank 2, 4, 6 and 8) can be obtained by using A1, B1 and B2, as shown This procedure (4) used for designing codebook can be applied to systems employing any number of transmit antennas.

In this procedure (4), two alternative DL codebooks are provided for 8Tx pre-coded transmissions, one of which focuses on rigorously maintaining the nested property, while the other places more priority on achieving good performance regardless of antenna configuration such as cross polarization and highly correlated ULA. Initially, the size of the codebook is considered to be 4 bits; however, the actual codebook size may depend upon the particular uncorrelated case and multi-user MIMO scheme being employed.

(5) IEEE 802.16m Further Enhancement to 8Tx Codebook

Figure 9:
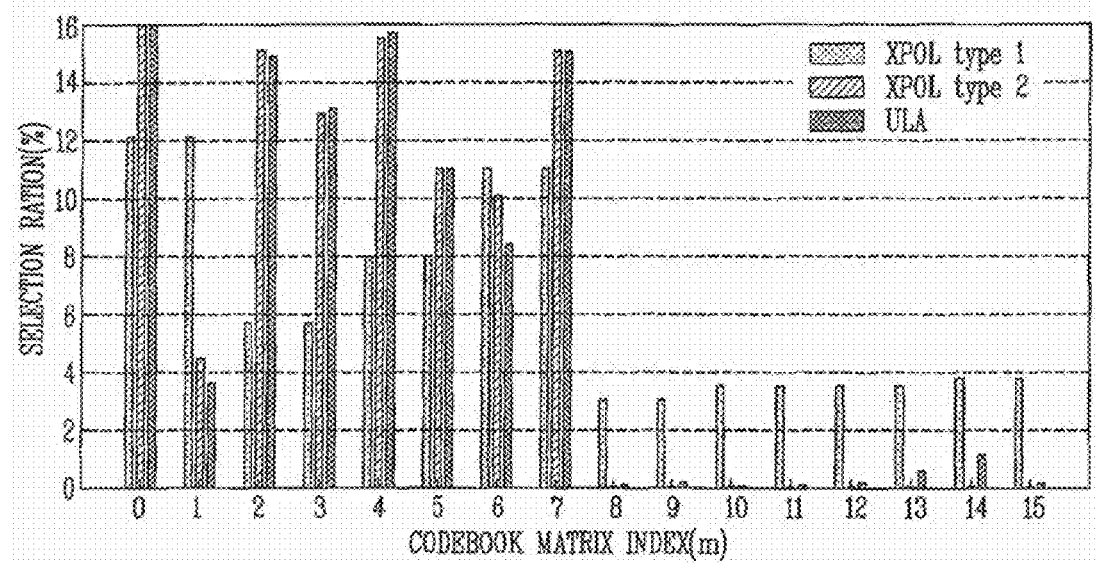
FIG. 9 shows an exemplary codebook matrix selection ratio when using AWD codebook for rank 2 under ULA and XPOL.

The current AWD has 8Tx codebook of 4-bit size per rank which provisions enough beamforming gain for highly correlated case. When applying this 8Tx codebook for a MIMO system with a uniform linear array and cross-polarized (XPOL) antennas, we can observe that several entries of the codebook for rank 2 do not play a role as shown in FIG. 9. The last 8 entries of codebook for rank 2 are identified as unimportant entries through SLS. This contribution suggests the new entries of codebook for rank 2 to enhance the performance of SU-MIMO.

Figure 10:
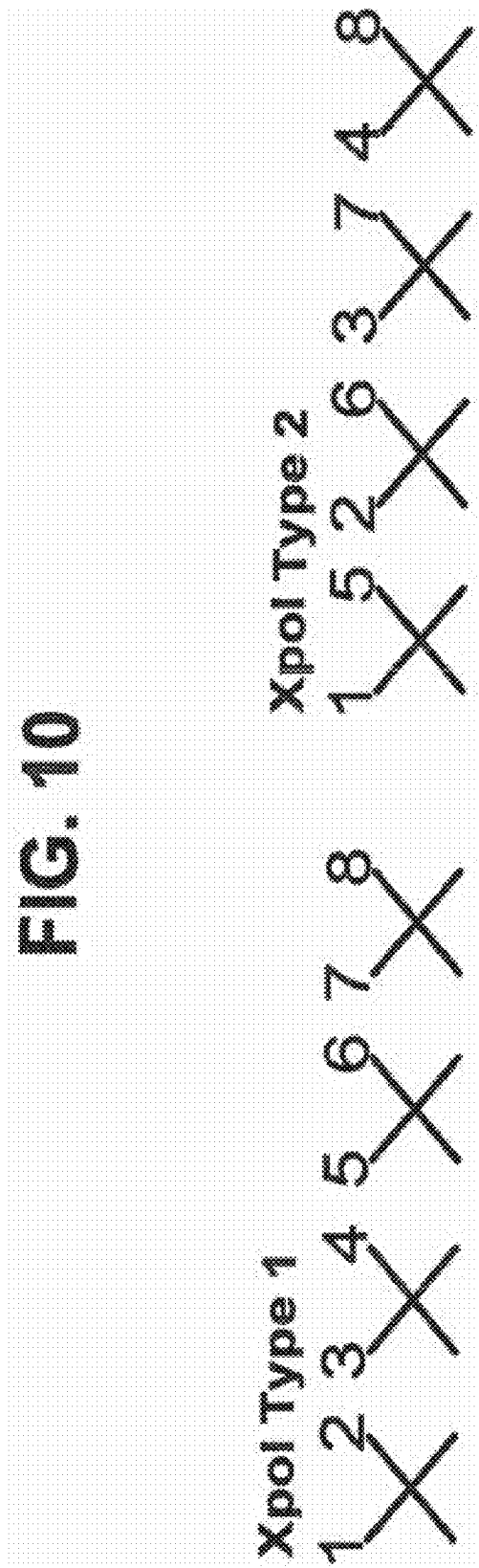
FIG. 10 shows two exemplary types for antenna indexing for XPOL type 1 and XPOL tune 2

FIG. 9 shows a Codebook matrix selection ratio when using AWD codebook for rank 2 under ULA and XPOL. In FIG. 9, XPOL type 1 and 2 means the two types for antenna indexing (for XPOL) as shown in FIG. 10.

Based upon the above-described procedures (1) through (5), the characteristics of a newly proposed 8Tx codebook can be summarized as follows. Namely, the entries 8-15 of the codebook for rank 2 can be replaced with the following matrices:

$$V8(:,:,4) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ 1 & 0 & -1 & 0 & j & 0 & -j & 0 \\ 0 & 1 & 0 & -1 & 0 & j & 0 & -j \\ 1 & 0 & 1 & 0 & -1 & 0 & -1 & 0 \\ 0 & 1 & 0 & 1 & 0 & -1 & 0 & -1 \\ 1 & 0 & -1 & 0 & -j & 0 & j & 0 \\ 0 & 1 & 0 & -1 & 0 & j & 0 & j \end{bmatrix},$$

$$V8(:,:,5) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ \frac{1+j}{\sqrt{2}} & 0 & \frac{-1-j}{\sqrt{2}} & 0 & \frac{-1+j}{\sqrt{2}} & 0 & \frac{1-j}{\sqrt{2}} & 0 \\ 0 & \frac{1+j}{\sqrt{2}} & 0 & \frac{-1-j}{\sqrt{2}} & 0 & \frac{-1+j}{2} & 0 & \frac{1-j}{\sqrt{2}} \\ j & 0 & j & 0 & -j & 0 & -j & 0 \\ 0 & j & 0 & j & 0 & -j & 0 & -j \\ \frac{-1+j}{\sqrt{2}} & 0 & \frac{1-j}{\sqrt{2}} & 0 & \frac{1+j}{\sqrt{2}} & 0 & \frac{-1-j}{\sqrt{2}} & 0 \\ 0 & \frac{-1+j}{\sqrt{2}} & 0 & \frac{1-j}{\sqrt{2}} & 0 & \frac{1+j}{\sqrt{2}} & 0 & \frac{-1-j}{\sqrt{2}} \end{bmatrix}$$

| Binary index | m | Base matrix | C(8, 2, 4, m) |
|---|---|---|---|
| 1000 | 8 | $V8(:,:,4)$ | 1 2 |
| 1001 | 9 | | 3 4 |
| 1010 | 10 | | 5 6 |
| 1011 | 11 | | 7 8 |
| 1100 | 12 | $V8(:,:,5)$ | 1 2 |
| 1101 | 13 | | 3 4 |
| 1110 | 14 | | 5 6 |
| 1111 | 15 | | 7 8 |

Regarding the comparison in performance, for XPol type 2, the base matrices were modified as below:

$$V8(:,:,4) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ 1 & 0 & -1 & 0 & j & 0 & -j & 0 \\ 0 & 1 & 0 & -1 & 0 & j & 0 & -j \\ 1 & 0 & 1 & 0 & -1 & 0 & -1 & 0 \\ 0 & 1 & 0 & 1 & 0 & -1 & 0 & -1 \\ 1 & 0 & -1 & 0 & -j & 0 & j & 0 \\ 0 & 1 & 0 & -1 & 0 & j & 0 & j \end{bmatrix}$$

$$V8(:,:,5) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ \frac{1+j}{\sqrt{2}} & 0 & \frac{-1-j}{\sqrt{2}} & 0 & \frac{-1+j}{\sqrt{2}} & 0 & \frac{1-j}{\sqrt{2}} & 0 \\ 0 & \frac{1+j}{\sqrt{2}} & 0 & \frac{-1-j}{\sqrt{2}} & 0 & \frac{-1+j}{2} & 0 & \frac{1-j}{\sqrt{2}} \\ j & 0 & j & 0 & -j & 0 & -j & 0 \\ 0 & j & 0 & j & 0 & -j & 0 & -j \\ \frac{-1+j}{\sqrt{2}} & 0 & \frac{1-j}{\sqrt{2}} & 0 & \frac{1+j}{\sqrt{2}} & 0 & \frac{-1-j}{\sqrt{2}} & 0 \\ 0 & \frac{-1+j}{\sqrt{2}} & 0 & \frac{1-j}{\sqrt{2}} & 0 & \frac{1+j}{\sqrt{2}} & 0 & \frac{-1-j}{\sqrt{2}} \end{bmatrix}$$

Figure 11A:
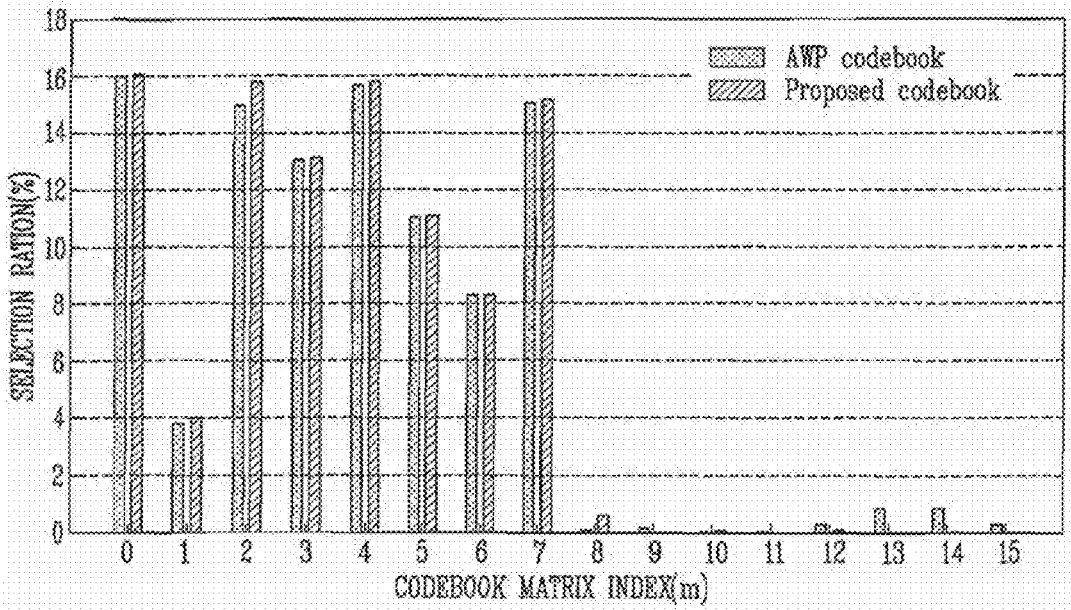
FIG. 11 shows some exemplary experimental results for the selection ratio of codebook matrices under several antenna configurations.
Figure 11B:
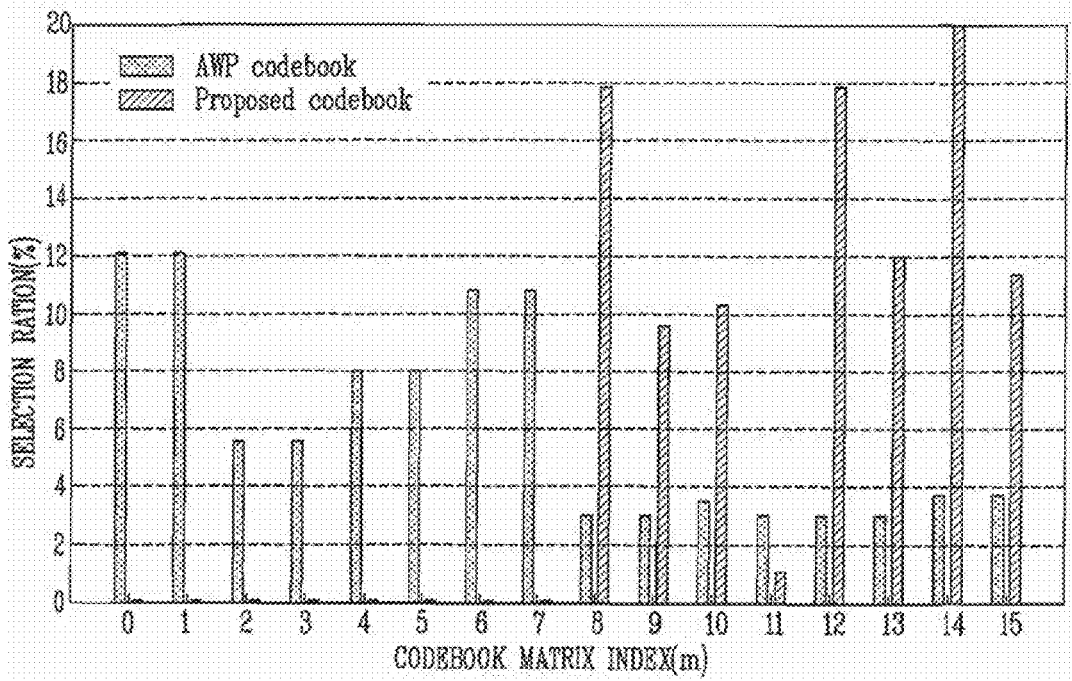

FIG. 11 (including (a) through (c)) illustrate some experimental results for the Selection ratio of codebook matrices under several antenna configurations. Namely, FIGS. 11A-11C show some experimental results for the comparison of the selection ratio for the codebook matrices through the SLS based on the following simulation assumptions:

| | | | | |
|---|---|---|---|---|
| Bandwidth | 10 MHz (TDD | Antenna Configuration | Xpol |
| ISD | 1.5 km | Antenna spacing at BS | 0.5 λ |
| Fading Channel | Ped-B 3 km/h | # of Rx at MS | 2 |
| Center Frequency | 2 GHz | Rank Adaptation | 2 |

The last 8 entries of the current codebook for rank 2 do not play important roles in both ULA and XPol antenna configuration as shown in FIGS. 11A-11C, while the proposed 8 entries show a significant contribution for the XPol cases. FIGS. 11A-11C imply that the block diagonal matrices or their permuted version are more proper base matrices for the XPol configuration.

The following Table 3 proves this implication in terms of sector throughput. The newly proposed codebook gives significant gain in case of the XPol configurations without increasing feedback overhead, while keeping the performance in ULA case.

TABLE 1

| Throughput comparison through SLS | | | |
|---|---|---|---|
| Antenna configuration | Codebook | Average sector throughput | Cell edge user throughput |
| ULA | AWD | 1.95 (100%) | 0.77 |
| | Proposed | 1.95 (100%) | 0.77 |
| Xpol type 1 | AWD | 1.25 (100%) | 0.42 |
| | Proposed | 2.94 (235%) | 0.86 |
| Xpol type 2 | AWD | 2.68 (100%) | 0.78 |
| | Proposed | 2.94 (108%) | 0.86 |

Accordingly, in the IEEE 802.16m technical standard and/or in other related technical standards, the following two matrices can be implemented for a SU-MIMO base codebook:

$$V8(:,:,4) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ 1 & 0 & -1 & 0 & j & 0 & -j & 0 \\ 0 & 1 & 0 & -1 & 0 & j & 0 & -j \\ 1 & 0 & 1 & 0 & -1 & 0 & -1 & 0 \\ 0 & 1 & 0 & 1 & 0 & -1 & 0 & -1 \\ 1 & 0 & -1 & 0 & -j & 0 & j & 0 \\ 0 & 1 & 0 & -1 & 0 & j & 0 & j \end{bmatrix}$$

$$V8(:,:,5) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ \frac{1+j}{\sqrt{2}} & 0 & \frac{-1-j}{\sqrt{2}} & 0 & \frac{-1+j}{\sqrt{2}} & 0 & \frac{1-j}{\sqrt{2}} & 0 \\ 0 & \frac{1+j}{\sqrt{2}} & 0 & \frac{-1-j}{\sqrt{2}} & 0 & \frac{-1+j}{2} & 0 & \frac{1-j}{\sqrt{2}} \\ j & 0 & j & 0 & -j & 0 & -j & 0 \\ 0 & j & 0 & j & 0 & -j & 0 & -j \\ \frac{-1+j}{\sqrt{2}} & 0 & \frac{1-j}{\sqrt{2}} & 0 & \frac{1+j}{\sqrt{2}} & 0 & \frac{-1-j}{\sqrt{2}} & 0 \\ 0 & \frac{-1+j}{\sqrt{2}} & 0 & \frac{1-j}{\sqrt{2}} & 0 & \frac{1+j}{\sqrt{2}} & 0 & \frac{-1-j}{\sqrt{2}} \end{bmatrix}$$

Also, in the IEEE 802.16m technical standard and/or in other related technical standards, the Table shown in FIG. 12 can be defined.

To sum up, the various inventive concepts and features of the present disclosure can be described in the following manner.

The present disclosure provides a method of improving codebook based precoding techniques, whereby particular codebook entries used for a MIMO system of a lower dimension (i.e., having a relatively low number of antennas) can be used to newly generate a codebook for a MIMO system of a higher dimension (i.e., having a relatively high number of antennas).

Figure 13:
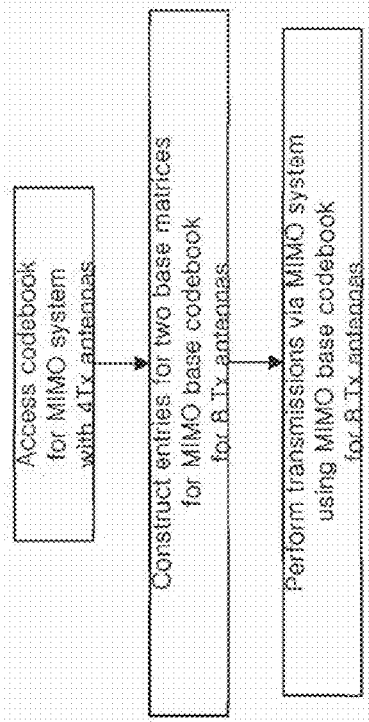
FIG. 13 shows an exemplary flow chart to explain the basic method procedures of using particular codebook entries used for a MIMO system of a lower dimension to newly generate a codebook for a MIMO system of a higher dimension, and a basic schematic diagram of a MIMO device (e.g., mobile station) that can implement such method.
Figure 13:
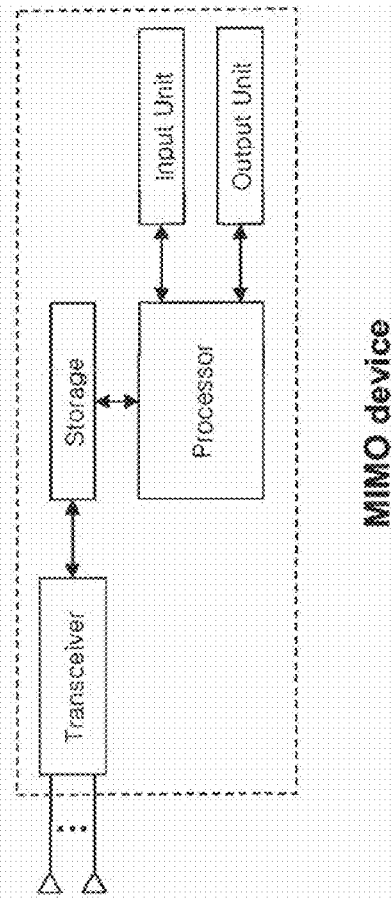

In particular, with reference to FIG. 13, the steps of accessing to a codebook related to a Multiple Input Multiple Output (MIMO) system having four transmit antennas, the codebook being stored in a memory and having entries for rank 1 through rank 8, each rank denoting a particular spatial multiplexing order; using the entries in rank 1 of the codebook related to the MIMO system having four transmit antennas to newly construct entries for rank 1 through rank 8 of two base matrices for a MIMO base codebook related to eight transmit antennas; and performing transmissions for the MIMO system using said MIMO base codebook related to eight transmit antennas may be performed.

However, it can be understood that the presently proposed procedures described thus far can lead to other additional and/or alternative ways of selecting particular codebook entries used for a MIMO system of a lower dimension (i.e., having a relatively low number of antennas) to be employed in newly generating a codebook for a MIMO system of a higher dimension (i.e., having a relatively high number of antennas). For example, one or more certain odd numbered or even numbered columns (or other specific groups of entries) among the various codebook entries may be appropriately selected and used in newly generating a codebook for a MIMO system of a higher dimension.

Also, with reference to FIG. 13, the present disclosure also provides an apparatus (e.g., device having appropriate hardware components such as a processing unit, controller, CPU, microprocessor(s), memory or storage, etc. that access and execute corresponding software code) that is able to implement and carry out the above-described method.

Figure 14:
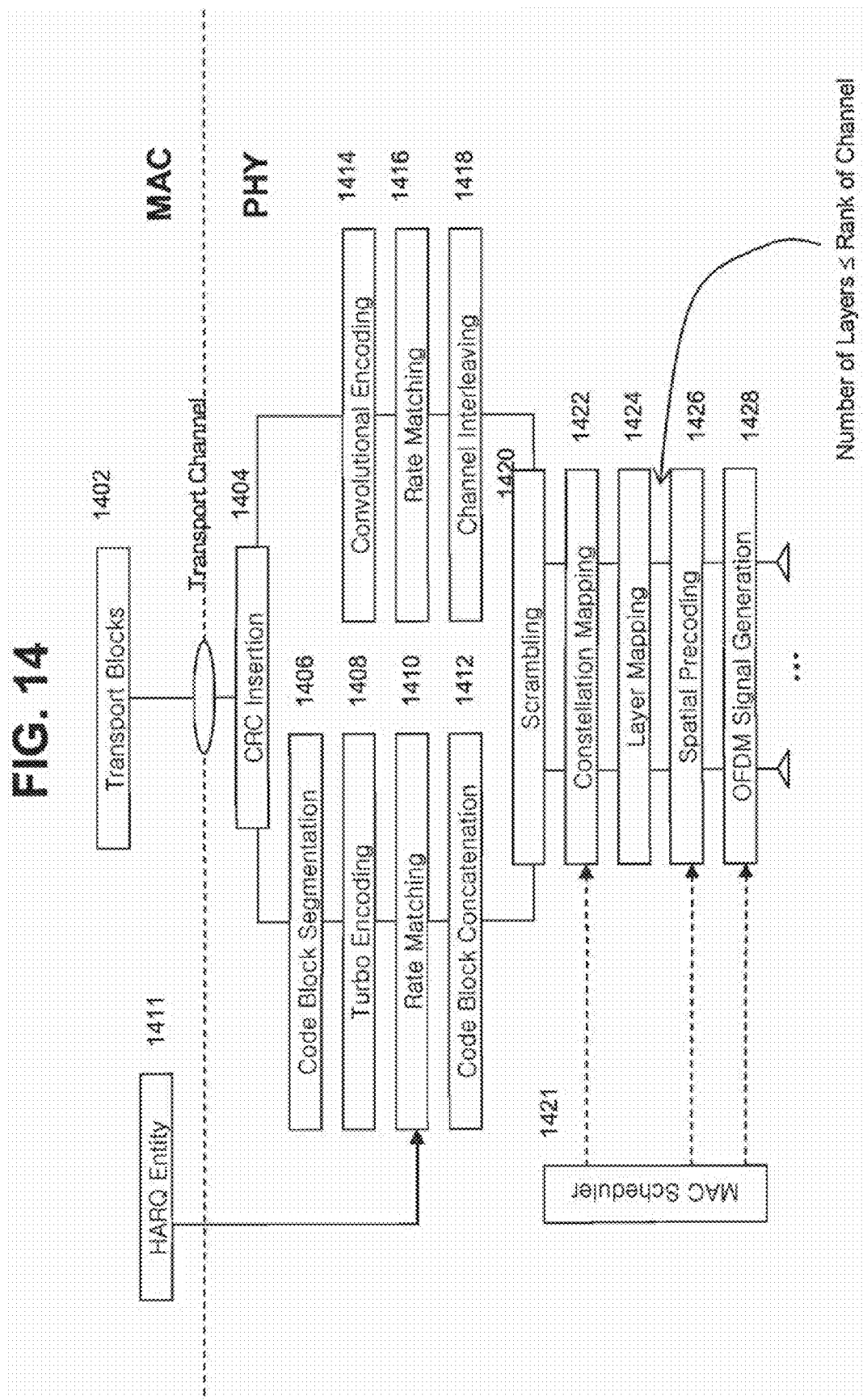
FIG. 14 shows exemplary conceptual block diagrams of the protocol layers (MAC-PHY) and various entities supporting MIMO-OFDM at the transmitter (downlink scenario).

FIG. 14 shows exemplary conceptual block diagrams of the protocol layers (MAC-PHY) and various entities supporting MIMO-OFDM at the transmitter (downlink scenario).

First, transport blocks from the MAC layer are delivered to the physical (PHY) layer via one or more transport channels (1402). After performing CRC insertion (1404), and the procedures of code block segmentation (1406), turbo encoding (1408), rate matching (1410), and code block concatenation (1412) are performed. Here, a HARQ entity (1411) is involved in performing rate matching (1410). After performing CRC insertion (1404), alternatively and/or additionally, the procedures of convolution encoding (1414), rate matching (1416), and channel interleaving (1418) are performed.

Thereafter, the procedures of scrambling (1420), constellation mapping (1422), layer mapping (1424), spatial precoding (1426), and OFDM signal generation (1428) are performed. Here, a MAC scheduler (1421) is involved in constellation mapping (1422), spatial precoding (1426), and OFDM signal generation (1428). Also, between layer mapping (1424) and spatial precoding (1426) procedures, it is understood that the number of layers is less than or equal to the rank of the channel.

The various procedures related to using particular codebook entries for a MIMO system of a lower dimension (i.e., having a relatively low number of antennas) in newly generating a codebook for a MIMO system of a higher dimension (i.e., having a relatively high number of antennas) are performed in relation to spatial precoding (1426). Namely, during spatial precoding (1426), the entries in rank 1 of the codebook related to the MIMO system having four transmit antennas are used to newly construct entries for rank 1 through rank 8 of two base matrices for a MIMO base codebook related to eight transmit antennas.

Figure 15:
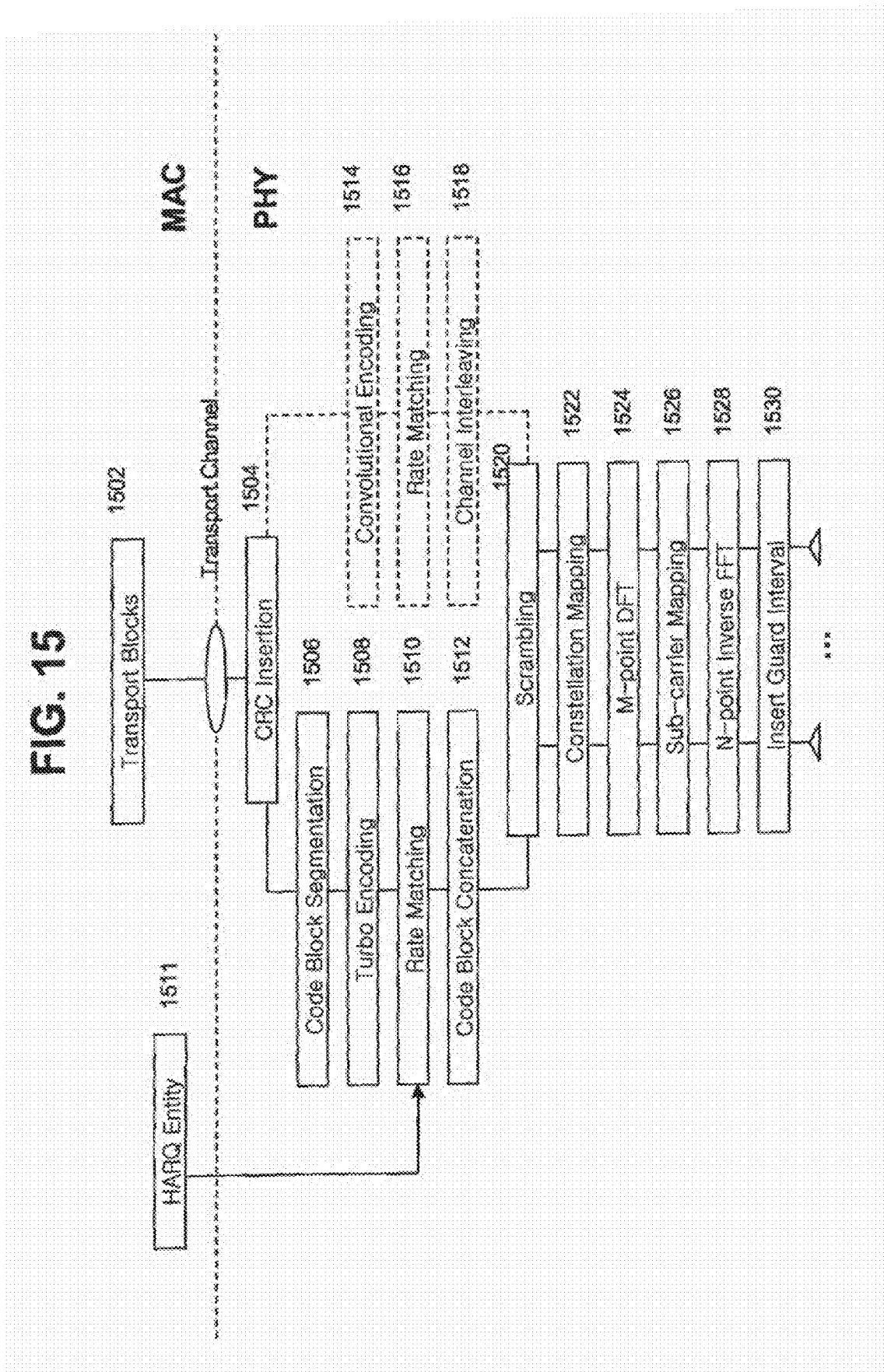
FIG. 15 shows exemplary conceptual block diagrams of the protocol layers (MAC-PHY) and various entities supporting MIMO-OFDM at the receiver (uplink scenario).

FIG. 15 shows exemplary conceptual block diagrams of the protocol layers (MAC-PHY) and various entities supporting MIMO-OFDM at the receiver (uplink scenario).

Basically, the opposite and corresponding procedures to those shown in FIG. 14 are performed. Upon signal reception via multiple antennas, the procedures up to constellation mapping (1522) and then scrambling (1520) are a bit different than those in FIG. 14. Namely, the procedures of inserting guard intervals (1530), N-point Inverse FFT (1528), sub-carrier mapping (1526), and M-point DFT (1524) are performed. The subsequent procedures (1512-1510-1508-1506-(1518-1516-1514)-1504) leading to the delivery of transport blocks (1502) from the physical layer (PHY) to the MAC layer are similar but performed in opposite order to those in FIG. 14.

The various features and concepts described herein may be implemented in software, hardware, or a combination thereof. For example, a computer program (that is executed by a processor, controller, CPU, etc. in a computer, a mobile terminal and/or a network device) that implements a method and apparatus for employing particular codebook entries used for a MIMO system of a lower dimension to be used in generating a codebook for a MIMO system of a higher dimension may be comprised of one or more program code sections or modules for performing various tasks. Similarly, a software tool (that is executed by a processor, controller, CPU, etc. in a computer, a mobile terminal and/or a network device) for a method and apparatus for employing particular codebook entries used for a MIMO system of a lower dimension to be used in newly generating a codebook for a MIMO system of a higher dimension may comprise program code sections or modules that are executed by a processor (or other controller such as a CPU) for performing various tasks.

The method and apparatus for employing particular codebook entries used for a MIMO system of a lower dimension to be used in newly generating a codebook for a MIMO system of a higher dimension according to this description are compatible with various types of technologies and standards. Certain concepts described herein are related to particular standards, such as 3GPP (LTE, LTE-Advanced, etc.), IEEE, 4G, GSM, WCDMA, and the like. However, it can be understood that the above exemplary standards are not intended to be limited, as other related standards and technologies would also be applicable to the various features and concepts described herein.

The features described herein can be summarized as follows:

The present disclosure provides a method comprising: accessing to a codebook related to a Multiple Input Multiple Output (MIMO) system having four transmit antennas, the codebook being stored in a storage medium and having entries for rank 1 through rank 4, each rank denoting a particular spatial multiplexing order; using the entries in rank 1 of the codebook related to the MIMO system having four transmit antennas to newly construct entries for rank 1 through rank 8 of two base matrices for a MIMO base codebook related to eight transmit antennas; and performing transmissions for the MIMO system using said MIMO base codebook related to eight transmit antennas.

In such method, the two base matrices are defined as V8(:,:,4) and V8(:,:,5) having a form of:

$$V8(:,:,4) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ 1 & 0 & -1 & 0 & j & 0 & -j & 0 \\ 0 & 1 & 0 & -1 & 0 & j & 0 & -j \\ 1 & 0 & 1 & 0 & -1 & 0 & -1 & 0 \\ 0 & 1 & 0 & 1 & 0 & -1 & 0 & -1 \\ 1 & 0 & -1 & 0 & -j & 0 & j & 0 \\ 0 & 1 & 0 & -1 & 0 & j & 0 & j \end{bmatrix}$$

$$V8(:,:,5) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ \frac{1+j}{\sqrt{2}} & 0 & \frac{-1-j}{\sqrt{2}} & 0 & \frac{-1+j}{\sqrt{2}} & 0 & \frac{1-j}{\sqrt{2}} & 0 \\ 0 & \frac{1+j}{\sqrt{2}} & 0 & \frac{-1-j}{\sqrt{2}} & 0 & \frac{-1+j}{2} & 0 & \frac{1-j}{\sqrt{2}} \\ j & 0 & j & 0 & -j & 0 & -j & 0 \\ 0 & j & 0 & j & 0 & -j & 0 & -j \\ \frac{-1+j}{\sqrt{2}} & 0 & \frac{1-j}{\sqrt{2}} & 0 & \frac{1+j}{\sqrt{2}} & 0 & \frac{-1-j}{\sqrt{2}} & 0 \\ 0 & \frac{-1+j}{\sqrt{2}} & 0 & \frac{1-j}{\sqrt{2}} & 0 & \frac{1+j}{\sqrt{2}} & 0 & \frac{-1-j}{\sqrt{2}} \end{bmatrix}$$

for said MIMO base codebook related to eight transmit antennas. A base station provides signaling to a mobile station in order to indicate whether an antenna configuration related to Type I or Type II is being used. The eight transmit antennas are cross-polarized antennas. The MIMO base codebook related to eight transmit antennas supports at least one of IEEE 802.16 related technology and 3GPP LTE related technology.

Also, the present disclosure provides an apparatus comprising: a transceiver to transmit and receive radio signals that carry data and information to and from a base station; a storage medium to store data and information including at least one codebook related to a Multiple Input Multiple Output (MIMO) system having four transmit antennas; and a processor cooperating with the storage medium and configured to access the codebook having entries for rank 1 through rank 4, each rank denoting a particular spatial multiplexing order, then use the entries in rank 1 of the codebook related to the MIMO system having four transmit antennas to newly construct entries for rank 1 through rank 8 of two base matrices for a MIMO base codebook related to eight transmit antennas, and performing feedback indicating an entry index of said MIMO base codebook related to eight transmit antennas.

In such apparatus, the two base matrices are defined as V8(:,:,4) and V8(:,:,5) having a form of:

$$V8(:,:,4) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ 1 & 0 & -1 & 0 & j & 0 & -j & 0 \\ 0 & 1 & 0 & -1 & 0 & j & 0 & -j \\ 1 & 0 & 1 & 0 & -1 & 0 & -1 & 0 \\ 0 & 1 & 0 & 1 & 0 & -1 & 0 & -1 \\ 1 & 0 & -1 & 0 & -j & 0 & j & 0 \\ 0 & 1 & 0 & -1 & 0 & j & 0 & j \end{bmatrix}$$

-continued $$V8(:,:,5) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ \frac{1+j}{\sqrt{2}} & 0 & \frac{-1-j}{\sqrt{2}} & 0 & \frac{-1+j}{\sqrt{2}} & 0 & \frac{1-j}{\sqrt{2}} & 0 \\ 0 & \frac{1+j}{\sqrt{2}} & 0 & \frac{-1-j}{\sqrt{2}} & 0 & \frac{-1+j}{2} & 0 & \frac{1-j}{\sqrt{2}} \\ j & 0 & j & 0 & -j & 0 & -j & 0 \\ 0 & j & 0 & j & 0 & -j & 0 & -j \\ \frac{-1+j}{\sqrt{2}} & 0 & \frac{1-j}{\sqrt{2}} & 0 & \frac{1+j}{\sqrt{2}} & 0 & \frac{-1-j}{\sqrt{2}} & 0 \\ 0 & \frac{-1+j}{\sqrt{2}} & 0 & \frac{1-j}{\sqrt{2}} & 0 & \frac{1+j}{\sqrt{2}} & 0 & \frac{-1-j}{\sqrt{2}} \end{bmatrix}$$

for said MIMO base codebook related to eight transmit antennas. The base station provides signaling to a mobile station in order to indicate whether an antenna configuration related to Type I or Type II is being used. The transceiver has at least eight transmit antennas. The eight transmit antennas are cross-polarized antennas. The MIMO base codebook related to eight transmit antennas supports at least one of IEEE 802.16 related technology and 3GPP LTE related technology.

Industrial Applicability

The features and concepts herein are applicable to and can be implemented in various types of user devices (e.g., mobile terminals, handsets, wireless communication devices, etc.) and/or network devices, entities, components, etc. that can be configured to support the use of particular codebook entries used for a MIMO system of a lower dimension in newly generating a codebook for a MIMO system of a higher dimension.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method comprising:
accessing a codebook related to a Multiple Input Multiple Output (MIMO) system having four transmit antennas, the codebook being stored in a storage medium and having entries for rank 1 through rank 4, each rank denoting a particular spatial multiplexing order;
using the entries in rank 1 of the codebook construct entries for rank 1 through rank 8 of two base matrices for a MIMO base codebook related to eight transmit antennas;
performing transmissions for the MIMO system using said MIMO base codebook, and
providing feedback operations indicating an entry index of said MIMO base codebook, and
wherein the two base matrices for said MIMO base codebook are defined as V8(:,:,4) and V8(:,:,5) having a form of:

$$V8(:,:,4) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ 1 & 0 & -1 & 0 & j & 0 & -j & 0 \\ 0 & 1 & 0 & -1 & 0 & j & 0 & -j \\ 1 & 0 & 1 & 0 & -1 & 0 & -1 & 0 \\ 0 & 1 & 0 & 1 & 0 & -1 & 0 & -1 \\ 1 & 0 & -1 & 0 & -j & 0 & j & 0 \\ 0 & 1 & 0 & -1 & 0 & j & 0 & j \end{bmatrix}$$

$$V8(:,:,5) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ \frac{1+j}{\sqrt{2}} & 0 & \frac{-1-j}{\sqrt{2}} & 0 & \frac{-1+j}{\sqrt{2}} & 0 & \frac{1-j}{\sqrt{2}} & 0 \\ 0 & \frac{1+j}{\sqrt{2}} & 0 & \frac{-1-j}{\sqrt{2}} & 0 & \frac{-1+j}{2} & 0 & \frac{1-j}{\sqrt{2}} \\ j & 0 & j & 0 & -j & 0 & -j & 0 \\ 0 & j & 0 & j & 0 & -j & 0 & -j \\ \frac{-1+j}{\sqrt{2}} & 0 & \frac{1-j}{\sqrt{2}} & 0 & \frac{1+j}{\sqrt{2}} & 0 & \frac{-1-j}{\sqrt{2}} & 0 \\ 0 & \frac{-1+j}{\sqrt{2}} & 0 & \frac{1-j}{\sqrt{2}} & 0 & \frac{1+j}{\sqrt{2}} & 0 & \frac{-1-j}{\sqrt{2}} \end{bmatrix}.$$

2. The method of claim 1, wherein a base station is configured to provide signaling to a mobile station in order to indicate whether an antenna configuration related to Type I or Type II is being used, wherein Type I and Type II are types of antenna indexing.

3. The method of claim 1, wherein the eight transmit antennas are cross-polarized antennas.

4. The method of claim 1, wherein said MIMO base codebook is configured to support at least IEEE 802.16 related technology 3GPP LTE related technology.

5. An apparatus comprising:
a transceiver configured to transmit and receive radio signals that carry data to and from a base station;
a storage medium configured to store data and information including at least one codebook related to a Multiple Input Multiple Output (MIMO) system having four transmit antennas; and a processor configured to interwork with the storage medium and to access the codebook having entries for rank 1 through rank 4, each rank denoting a particular spatial multiplexing order, wherein the processor is further configured to:

use the entries in rank 1 of the codebook related to the MIMO system to newly construct entries for rank 1 through rank 8 of two base matrices for a MIMO base codebook related to eight transmit antennas, perform feedback operations indicating an entry index of said MIMO base codebook, and wherein the two base matrices for said MIMO base codebook are defined as V8(:,:,4) and V8(:,:,5) having a form of:

$$V8(:,:,4) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ 1 & 0 & -1 & 0 & j & 0 & -j & 0 \\ 0 & 1 & 0 & -1 & 0 & j & 0 & -j \\ 1 & 0 & 1 & 0 & -1 & 0 & -1 & 0 \\ 0 & 1 & 0 & 1 & 0 & -1 & 0 & -1 \\ 1 & 0 & -1 & 0 & -j & 0 & j & 0 \\ 0 & 1 & 0 & -1 & 0 & j & 0 & j \end{bmatrix}$$

$$V8(:,:,5) = \frac{1}{\sqrt{4}} \begin{bmatrix} 1 & 0 & 1 & 0 & 1 & 0 & 1 & 0 \\ 0 & 1 & 0 & 1 & 0 & 1 & 0 & 1 \\ \frac{1+j}{\sqrt{2}} & 0 & \frac{-1-j}{\sqrt{2}} & 0 & \frac{-1+j}{\sqrt{2}} & 0 & \frac{1-j}{\sqrt{2}} & 0 \\ 0 & \frac{1+j}{\sqrt{2}} & 0 & \frac{-1-j}{\sqrt{2}} & 0 & \frac{-1+j}{2} & 0 & \frac{1-j}{\sqrt{2}} \\ j & 0 & j & 0 & -j & 0 & -j & 0 \\ 0 & j & 0 & j & 0 & -j & 0 & -j \\ \frac{-1+j}{\sqrt{2}} & 0 & \frac{1-j}{\sqrt{2}} & 0 & \frac{1+j}{\sqrt{2}} & 0 & \frac{-1-j}{\sqrt{2}} & 0 \\ 0 & \frac{-1+j}{\sqrt{2}} & 0 & \frac{1-j}{\sqrt{2}} & 0 & \frac{1+j}{\sqrt{2}} & 0 & \frac{-1-j}{\sqrt{2}} \end{bmatrix}.$$

6. The apparatus of claim 5, wherein a base station is configured to provide signaling to a mobile station in order to indicate whether an antenna configuration related to Type I or Type II is being used, wherein Type I and Type II are types of antenna indexing.

7. The apparatus of claim 5, wherein the transceiver has at least eight transmit antennas.

8. The apparatus of claim 7, wherein the eight transmit antennas are cross-polarized antennas.

9. The apparatus of claim 5, wherein said MIMO base codebook is configured to support at least IEEE 802.16 related technology or 3GPP LTE related technology.

* * * * *